US010984312B2

United States Patent
Amir et al.

(10) Patent No.: US 10,984,312 B2
(45) Date of Patent: *Apr. 20, 2021

(54) MAPPING GRAPHS ONTO CORE-BASED NEUROMORPHIC ARCHITECTURES

(71) Applicant: International Business Machines Corporation, Armonk, NY (US)

(72) Inventors: Arnon Amir, Saratoga, CA (US); Pallab Datta, San Jose, CA (US); Paul A. Merolla, Palo Alto, CA (US); Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 839 days.

This patent is subject to a terminal disclaimer.

(21) Appl. No.: 15/802,998

(22) Filed: Nov. 3, 2017

(65) Prior Publication Data

US 2018/0075340 A1  Mar. 15, 2018

Related U.S. Application Data

(63) Continuation of application No. 14/528,885, filed on Oct. 30, 2014, now Pat. No. 9,852,370.

(51) Int. Cl.
   *G06N 3/04*     (2006.01)
   *G06N 3/063*    (2006.01)
   *G06N 3/08*     (2006.01)

(52) U.S. Cl.
   CPC .......... *G06N 3/049* (2013.01); *G06N 3/063* (2013.01); *G06N 3/088* (2013.01)

(58) Field of Classification Search
   CPC .......... G06N 3/04; G06N 3/049; G06N 3/063; G06N 3/08; G06N 3/088; G06F 9/44505;
   (Continued)

(56) References Cited

U.S. PATENT DOCUMENTS 6,269,353 B1   7/2001  Sethi et al.
6,463,438 B1  10/2002  Veltri
(Continued)

FOREIGN PATENT DOCUMENTS

CN   104685516 A    8/2013
WO   2013043610 A1  3/2013

OTHER PUBLICATIONS

Chinese Office Action dated Mar. 27, 2020 for Chinese Application No. 201680015986.7 from China Patent Office, pp. 1-14, Beijing City, China.
(Continued)

*Primary Examiner* — Li Wu Chang
(74) *Attorney, Agent, or Firm* — Sherman IP LLP; Kenneth L. Sherman; Hemavathy Perumal

(57) ABSTRACT

Embodiments of the invention provide a method for mapping a bipartite graph onto a neuromorphic architecture comprising of a plurality of interconnected neuromorphic core circuits. The graph includes a set of source nodes and a set of target nodes. The method comprises, for each source node, creating a corresponding splitter construct configured to duplicate input. Each splitter construct comprises a first portion of a core circuit. The method further comprises, for each target node, creating a corresponding merger construct configured to combine input. Each merger construct comprises a second portion of a core circuit. Source nodes and target nodes are connected based on a permutation of an interconnect network interconnecting the core circuits.

8 Claims, 20 Drawing Sheets

(58) Field of Classification Search
CPC ... G06F 17/5072; G06F 17/509; G06K 9/627; G10L 15/197

See application file for complete search history.

(56) References Cited

U.S. PATENT DOCUMENTS

| | | | |
|---|---|---|---|
| 6,622,135 | B1 | 9/2003 | Imbert De Tremiolles et al. |
| 6,990,444 | B2 | 1/2006 | Hind et al. |
| 7,016,887 | B2 | 3/2006 | Stockfisch |
| 7,089,592 | B2 | 8/2006 | Adjaoute |
| 7,721,336 | B1 | 5/2010 | Adjaoute |
| 7,814,038 | B1 | 10/2010 | Repici |
| 7,904,398 | B1 | 3/2011 | Repici |
| 7,953,221 | B2 | 5/2011 | Feghali et al. |
| 8,332,340 | B2 | 12/2012 | Snider |
| 8,429,107 | B2 | 4/2013 | Denneau et al. |
| 8,515,885 | B2 | 8/2013 | Modha |
| 8,683,216 | B2 | 3/2014 | Harmonen |
| 8,712,941 | B2 | 4/2014 | Izhikevich et al. |
| 8,812,414 | B2 | 8/2014 | Arthur et al. |
| 8,868,477 | B2 | 10/2014 | Esser et al. |
| 8,904,347 | B2 | 12/2014 | Miloushev et al. |
| 8,909,576 | B2 | 12/2014 | Akopyan et al. |
| 8,977,583 | B2 | 3/2015 | Modha |
| 8,990,130 | B2 | 3/2015 | Alvarez-Icaza Rivera |
| 8,996,430 | B2 | 3/2015 | Modha |
| 9,020,867 | B2 | 4/2015 | Esser |
| 9,105,091 | B2 | 8/2015 | He et al. |
| 9,152,486 | B2 | 10/2015 | Bird |
| 9,164,737 | B2 | 10/2015 | Nathan et al. |
| 9,165,242 | B2 | 10/2015 | Park |
| 9,412,063 | B2 | 8/2016 | Appuswamy et al. |
| 9,489,622 | B2 | 11/2016 | Modha |
| 9,524,462 | B2 | 12/2016 | Esser et al. |
| 9,563,841 | B2 | 2/2017 | Alvarez-Icaza Rivera et al. |
| 9,639,802 | B2 | 5/2017 | Modha |
| 9,665,822 | B2 | 5/2017 | Esser et al. |
| 9,697,461 | B2 | 7/2017 | Modha |
| 9,747,545 | B2 | 8/2017 | Akopyan et al. |
| 9,798,972 | B2 | 10/2017 | Appuswamy et al. |
| 9,818,058 | B2 | 11/2017 | Arthur et al. |
| 9,852,006 | B2 | 12/2017 | Akopyan et al. |
| 9,971,965 | B2 | 5/2018 | Amir et al. |
| 10,204,301 | B2 | 2/2019 | Amir et al. |
| 2009/0276191 | A1 | 11/2009 | Bell, Jr. et al. |
| 2011/0004579 | A1 | 1/2011 | Snider |
| 2011/0106741 | A1 | 5/2011 | Denneau et al. |
| 2012/0016829 | A1 | 1/2012 | Snider |
| 2012/0084241 | A1 | 4/2012 | Friedman et al. |
| 2013/0031040 | A1 | 1/2013 | Modha |
| 2013/0073484 | A1 | 3/2013 | Izhikevich et al. |
| 2013/0073496 | A1 | 3/2013 | Szatmary et al. |
| 2013/0218821 | A1 | 8/2013 | Szatmary et al. |
| 2013/0232430 | A1 | 9/2013 | Reitan |
| 2013/0325775 | A1* | 12/2013 | Sinyavskiy ............ G06N 20/00 706/25 |
| 2014/0019392 | A1 | 1/2014 | Buibas |
| 2014/0052679 | A1 | 2/2014 | Sinyavskiy et al. |
| 2014/0180987 | A1 | 6/2014 | Arthur et al. |
| 2014/0258199 | A1 | 9/2014 | Modha et al. |
| 2014/0280075 | A1 | 9/2014 | Huang et al. |
| 2016/0247062 | A1 | 8/2016 | Amir |
| 2016/0275395 | A1 | 9/2016 | Amir |
| 2016/0283840 | A1 | 9/2016 | Amir |
| 2016/0335535 | A1 | 11/2016 | Amir |
| 2017/0017876 | A1 | 1/2017 | Modha |
| 2017/0140267 | A1 | 5/2017 | Modha |

OTHER PUBLICATIONS

Jin, X. et al., "Algorithm and software for simulation of spiking neural networks on the multi-chip SpiNNaker system", The 2010 International Joint Conference on Neural Networks (IJCNN), Jul. 8, 2010, pp. 1-8. IEEE, United States.

Schemmel, J. et al., "Implementing Synaptic Plasticity in a VLSI Spiking Neural Network Model", The 2006 IEEE International Joint Conference on Neural Network Proceedings, Jul. 16, 2006, pp. 1-6, IEEE, United States.

Ronghua, Z., "Electrical Model of the Neural Information Conduction", Chinese Doctoral Dissertation, Tianjin University, May 2012, CNKI.

Thomas, D. et al., "FPGA Accelerated Simulation of Biologically Plausible Spiking Neural Networks", 2009 17th IEEE symposium on field programmable custom computing machines, Apr. 5, 2009, pp. 45-52, IEEE.

International Search Report and Written Opinion dated Oct. 8, 2014 for International Application No. PCT/EP2014/051215 from European Patent Office, pp. 1-15, Rijswijk, Netherlands.

Preissl, R. et al., "Compass: A scalable simulator for an architecture for Cognitive Computing", Proceedings of the 2012 International Conference for High Performance Computing, Networking, Storage and Analysis (SC), Nov. 10-16, 2012, pp. 1-11, IEEE, United States.

Gleeson, P. et al., "NeuroML: A Language for Describing Data Driven Models of Neurons and Networks with a High Degree of Biological Detail", Jun. 17, 2010, PLOS Computational Biology, pp. 1-19, vol. 6, Issue 6, United States.

Arthur, J.V. et al., "Building Block of a Programmable Neuromorphic Substrate: A Digital Neurosynaptic Core", Proceedings of the 2012 World Congress on Computational Intelligence (WCCI), Jun. 10-15, 2012, IEEE, United States.

Munipalli, S.K., "An FPGA Implementation of a High Performance AER Packet Network", Jan. 1, 2013, Scholar Dissertations and Theses, pp. 1-105, Portland State University, PDXScholar, United States.

Cassidy, A.S. et al., "Cognitive Computing Building Block: A Versatile and Efficient Digital Neuron Model for Neurosynaptic Cores", Proceedings of the 2013 International Joint Conference on Neural Networks, 2013, pp. 1-10, IEEE, United States.

Wendt, K. et al., GMPath—A Path Language for Navigation, Information Query and Modification of Data Graphs, Proceedings of the 2010 6th International Workshop Artificial Neural Networks and Intelligent Information Processing (ANNIP 2010), 2010, pp. 33-42, United States.

Ehrlich, M. et al., "A software framework for mapping neural networks to a wafer-scale neuromorphic hardware system", Proceedings of the 2010 Artificial Neural Networks and Intelligent Information Processing Conference, 2010, 1-10, United States.

Rodriguez, A., et al., "Migrating Subarea Networks to an IP Infrastructure Using Enterprise Extender", ibm.com/Redbooks, Aug. 2000, pp, 1-276, IBM, United States.

Corneil, D. et al., "Real-time inference in a VLSI spiking neural network", Proceedings of the 2012 International Symposium on Circuits and Systems (ISCAS), May 20-23, 2012, pp. 2425-2428, IEEE, United States.

Brette, R. et al., "Simulation of networks of spiking neurons: A review of tools and strategies", J. of Computational Neuroscience, Apr. 12, 2007, pp. 1-50, Springer Science, United States.

Djurfeldt, M., "The Connection-set Algebra—A Novel Formalism for the Representation of Connectivity Structure in Neuronal Network Models", Neuroinformatics, Mar. 23, 2012, pp. 287-304, vol. 10, issue 3, Springer, United States.

Zoeter, O., "A new approximate inference method for spike and slab model: expectation propagation with a replication trick", May 9, 2013, pp. 1-13, IP.com, United States.

Fox, G.C., et al., "Load Balancing by a Neural Network", Oct. 31, 1986, pp. 1-55, IP.com, United States.

Chakrabarti, D. et al., "Fully Automatic Cross-Associations", Proceedings of the 10th ACM SIGKDD International Conference on Knowledge discovery and data mining (KDD '04), Aug. 22, 2004, pp. 79-88, ACM, United States.

Neuflow, "An embedded eye, in your hands", http://www.neuflow.org/, Feb. 6, 2012, p. 1-3, downloaded Feb. 13, 2015, United States.

Esser, S.K. et al., "Cognitive Computing Systems: Algorithms and Applications for Networks of Neurosynaptic Cores" Proceedings of the 2013 International Joint Conference on Neural Networks (IJCNN), Aug. 4, 2013, pp. 1-10, IEEE, United States.

(56) References Cited

OTHER PUBLICATIONS

IBM, "IBM creates new foundation to program SyNAPSE chips inspired by human brain", Phys. Org., Aug. 8, 2013, pp. 1-3, IBM, United States.
Booton, J., "After Watson, IBM Looks to Build 'Brain in a Box'", FOXBusiness, Aug. 22, 2013, pp. 1-2, United States.
Amir, A., et al., "Cognitive Computing Programming Paradigm: A Corelet Language for Composing Networks of Neurosynaptic Cores," in International Joint Conference on Neural Networks (IJCNN), 2013, p. 1-10, IEEE, United States.
Green, T.R.G. et al., "Usability Analysis of Visual Programming Environments: a 'cognitive dimensions' framework," Journal of Visual Languages and Computing, Jun. 1996, pp. 131-174, v. 7, issue 2, Elsevier, United States.
Nengo, "Nengo Neural Simulator", http://www.nengo.ca/, downloaded Feb. 13, 2015, p. 1-2, United States.
International Search Report and Written Opinion dated Apr. 29, 2016 for International Application No. PCT/EP2016/051334 from European Patent Office, pp. 1-12, Rijswijk, Netherlands.
Plesser, H.E. et al., "Efficient Parallel Simulation of Large-Scale Neuronal Networks on Clusters of Multiprocessor Computers", Proceedings in the 13th International Euro-Par Conference, Lecture Notes in Computer Science, Aug. 28, 2007, pp. 672-681, vol. 4641, France.
Djurfeldt, M., "Efficient generation of connectivity in neuronal networks from simulator-independent descriptions", Frontiers in Neuroinformatics, Apr. 22, 2014, pp. 1-12, vol. 8, Article 43, United States.
Minkovich,K. et al., "Programming Time-Multiplexed Reconfigurable Hardware Using a Scalable Neuromporhic Compiler", Proceedings of the IEEE Transaction on Neural Networks and Learning Systems, Jun. 212, pp. 889-900, vol. 23, No. 6, United States.
Galluppi, F. et al., "A Hierachical Configuration System for a Massively Parallel Hardware Platform", Proceedings of the 9th Conference on Computing Frontiers (CF'12), May 15, 2012, pp. 183-192, United States.
Wendt, K. et al., "A graph theoretical approach for a multistep mapping software for the FACETS project", Proceedings of the 2nd WSEAS International Conference on Computer Engineering and Applications (CEA'08), Jan. 25, 2008, pp. 189-194, Mexico.
Eichner, H. et al., "Neural simulations on multi-core architectures", Frontiers in Neuroinformatics, Jul. 9, 2009, pp. 1-15, vol. 3, Article 21, United States.
Extended European Search Report dated Feb. 8, 2017 for European Application No. 16152389.9 from European Patent Office, pp. 1-13, Munich, Germany.
Liiv, I., "Seriation and Matrix Reordering Methods: An Histroical Overview", Statistical Analysis and Data Mining, Mar. 11, 2010, pp. 70-91, vol. 3, No. 2, Wiley InterScience, United States.
Kumazawa, I. et al., "A Learning Scheme for Bipartite Recurrent Networks and Its Performance", Proceedings in the 1993 First New Zealand International Two-Stream Conference on Artificial Neural Networks and Expert Systems, Nov. 24-26, 1993, pp. 34-37, IEEE, United States.
Zhang, C. et al., "A Saturation Binary Neural Network for Bipartite Subgraph Problem", Proceeding in the ICIC'11 Proceedings of the 7th International Conference on Intelligent Computing: Bio-Inspired Computing and Applications, 2012, pp. 64-70, vol. 6840, Springer, Berlin.
Hikada, S. et al., "Towards a Compositional Approach to Model Transformation for Software Development" Proceedings of the 2009 ACM Symposium on Applied Computing, Mar. 8, 2009, pp. 468-475, ACM, United States.
Imam et al., "A Digital Neurosynaptic Core Using Event-Driven QDI Circuits", Proceedings of the 18th IEEE International Symposium on Asynchronous Circuits and Systems, May 1, 2012, pp. 1-8, IEEE, United States.
Sporns, O. et al. "Organization, Development and Function of Complex Brain Networks", TRENDS in Cognitive Sciences, Sep. 2004, pp. 418-425, vol. 8, No. 9, Elsevier, United States.
Rempis, C. W. et al., "Search Space Restriction of Neuro-evolution through Constrained Modularization of Neural Networks", Proceedings of the 6th International Workshop on Artificial Neural Networks and Intelligent Information Processing (ANNIIP), Jun. 2010. pp. 13-22, SciTePress, Madeira, Portugal.
Miller, B. et al., "Embedding-Based Placement of Processing Element Networks on FPGAs for Physical Model Simulation", Proceedings of the ACM/SIGDA International Symposium on Field programmable gate arrays (FPGA '13), Feb. 11-13, 2013, pp. 181-190, ACM, United States.
Wang, R. M. et al. "A Mixed-Signal Implementation of a Polychronous Spiking Neural Network with Delay Adaptation," Frontiers in Neuroscience, Mar. 18, 2014, pp. 1-16, vol. 8, Art. 51, PMC, United States.
Misra, J. et al., "Artificial Neural Networks in Hardware: A Survey of Two Decades of Progress", Neurocomputing, Dec. 2010, pp. 239-255, vol. 74, No. 1, Elsevier, United States.
Wang, F. et al., "A Hierarchical Neural Network Approach to the Development of a Library of Neural Models for Microwave Design", IEEE Transactions on Microwave Theory and Techniques, Dec. 1998, pp. 2391-2403, vol. 46, No. 12, IEEE Press, United States.
Biggerstaff, T.J. et al., "The Library Scaling Problem and the Limits of Concrete Component Reuse", Proceedings of the 3rd International Conference on Software Reuse, Nov. 1-4, 1994, pp. 102-109, IEEE, United States.
Shaw, B. et al., "Cognitive Computing Commercialization: Boundary Objects for Communication", Proceedings of the 3rd International Conference of Design Engineering and Management for Innovation, Sep. 4-6, 2013, pp. 1-10, IBM, United States.
U.S. Non-Final Office Action for U.S. Appl. No. 14/528,885 dated Apr. 21, 2017.
U.S. Notice of Allowance for U.S. Appl. No. 14/528,885 dated Aug. 16, 2017.
U.S. Non-Final Office Action for U.S. Appl. No. 14/669,575 dated Jul. 25, 2017.
U.S. Final Office Action for U.S. Appl. No. 14/669,575 dated Oct. 19, 2017.
U.S. Non-Final Office Action for U.S. Appl. No. 14/662,115 dated Oct. 4, 2017.
U.S. Non-Final Office Action for .S. Appl. No. 15/418,609 dated Jun. 21, 2017.
U.S. Non-Final Office Action for U.S. Appl. No. 14/995,506 dated Jul. 14, 2016.
U.S. Notice of Allowance for U.S. Appl. No. 14/995,506 dated Nov. 9, 2016.
U.S. Non-Final Office Action U.S. Appl. No. 13/791,505 dated May 12, 2015.
U.S. Notice of Allowance for U.S. Appl. No. 13/791,505 dated Oct. 15, 2015.
U.S. Non-Final Office Action for U.S. Appl. No. 14/626,677 dated Feb. 19, 2016.
U.S. Final Office Action for U.S. Appl. No. 14/626,677 dated Jul. 1, 2016.
U.S. Advisory Action for U.S. Appl. No. 14/626,677 dated Oct. 3, 2016.
U.S. Notice of Allowance for U.S. Appl. No. 14/626,677 dated Mar. 9, 2017.
Bruderle, D. et al., "A comprehensive workflow for general-purpose neural modeling with highly configurable neuromorphic hardware systems", Biological Cybernetics, Nov. 10, 2011, pp. 263-296, vol. 104, Springer-Verlag, Berlin, Germany.
Sporns, O. et al. "Theoretical neuroanatomy: relating anatomical and functional connectivity in graphs and cortical connection matrices", Cerebral Cortex, Feb. 1, 2000, pp. 127-141, vol. 10, No. 2, Oxford University Press, United Kingdom.
Siirtola, H. et al., "Constructing and reconstructing the reorderable matrix", Information Visualization, Feb. 3, 2005, pp. 32-48, vol. 4, No. 1, Palgrave Journals, United Kingdom.
Gemulla, R. et al., "Large-scale matrix factorization with distributed stochastic gradient descent", Proceedings of the 17th ACM SIGKDD International Conference on Knowledge Discovery and Data Mining, Mar. 16, 2011, pp. 1-49, ACM, United States.

(56) References Cited

OTHER PUBLICATIONS

Shukla, R. et al., "Evaluating hopfield-network-based linear solvers for hardware constrained neural substrates", Proceeding from the 2017 International Joint Conference on Neural Networkds (IJCNN), 2017, pp. 3938-3945, IEEE, United States.
Such, F.P. et al., "Robust Spatial Filtering With Graph Convolutional Neural Networks", IEEE Journal of Selected Topics in Signal Procesing, Sep. 2017, pp. 884-896, vol. 11, No. 6, IEEE, United States.
Diehl, P.U. et al., "Conversion of Artificial Recurrent Neural Networks to Spiking Neural Networks for Low-power Neuromorphic Hardware", Proceedings from the 2016 IEEE International Conference on Rebooting Computing (ICRC), 2016, pp. 1-8, IEEE, United States.
Wang, H. et al. "Locality-Preserved Maximum Information Projection", IEEE Transactions on Neural Networks, Apr. 2008, pp. 571-585, vol. 19, No. 4, IEEE, United States.
List of IBM Patents or Patent Applications Treated as Related Form.
Chinese Office Action dated Mar. 27, 2018 for Chinese Appiication No. 201610052235.4 from China Patent Office, pp. 1-13, Beijing City, China.
Chinese Office Action dated Mar. 13, 2018 for Chinese Application No. 201610024915.5 from China Patent Office, pp. 1-12, Beijing City, China.

\* cited by examiner

MAPPING GRAPHS ONTO CORE-BASED NEUROMORPHIC ARCHITECTURES

This invention was made with Government support under HR0011-09-C-0002 awarded by Defense Advanced Research Projects Agency (DARPA). The Government has certain rights in this invention.

BACKGROUND

The present invention relates to neuromorphic and neurosynaptic computation, and in particular, mapping graphs onto neuromorphic core-based architectures.

Neuromorphic and neurosynaptic computation, also referred to as artificial neural networks, are computational systems that are inspired by biological brains. For example, neuromorphic and neurosynaptic computation may comprise various electronic circuits and/or create connections between processing elements that are inspired by neurons of a biological brain.

In biological systems, the point of contact between an axon of a neural module and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

In one embodiment, the present invention provides a method for mapping a bipartite graph onto a neuromorphic architecture comprising of a plurality of interconnected neuromorphic core circuits. The graph includes a set of source nodes and a set of target nodes. The method comprises, for each source node, creating a corresponding splitter construct configured to duplicate input. Each splitter construct comprises a first portion of a core circuit. The method further comprises, for each target node, creating a corresponding merger construct configured to combine input. Each merger construct comprises a second portion of a core circuit. Source nodes and target nodes are connected based on a permutation of an interconnect network interconnecting the core circuits.

These and other features, aspects, and advantages of the present invention will become understood with reference to the following description, appended claims, and accompanying figures.

DETAILED DESCRIPTION

The present invention relates to neuromorphic and neurosynaptic computation, and in particular, mapping graphs onto neuromorphic core-based architectures. In one embodiment, the present invention provides a method for mapping a bipartite graph onto a neuromorphic architecture comprising of a plurality of interconnected neuromorphic core circuits. The graph includes a set of source nodes and a set of target nodes. The method comprises, for each source node, creating a corresponding splitter construct configured to duplicate input. Each splitter construct comprises a first portion of a core circuit. The method further comprises, for each target node, creating a corresponding merger construct configured to combine input. Each merger construct comprises a second portion of a core circuit. Source nodes and target nodes are connected based on a permutation of an interconnect network interconnecting the core circuits.

The term electronic neuron as used herein represents an architecture inspired by a biological neuron. An electronic neuron creates connections between processing elements that are inspired by neurons of a biological brain. As such, neuromorphic and neurosynaptic computation comprising electronic neurons according to embodiments of the invention may include various electronic circuits and/or processing elements (including computer simulations) that are inspired by biological neurons. Although certain illustrative embodiments of the invention are described herein using electronic neurons comprising electronic circuits, the present invention is not limited to electronic circuits. Indeed, embodiments of the invention can take the form of an entirely hardware embodiment, an entirely software embodiment or an embodiment containing both hardware and software elements.

Figure 1:
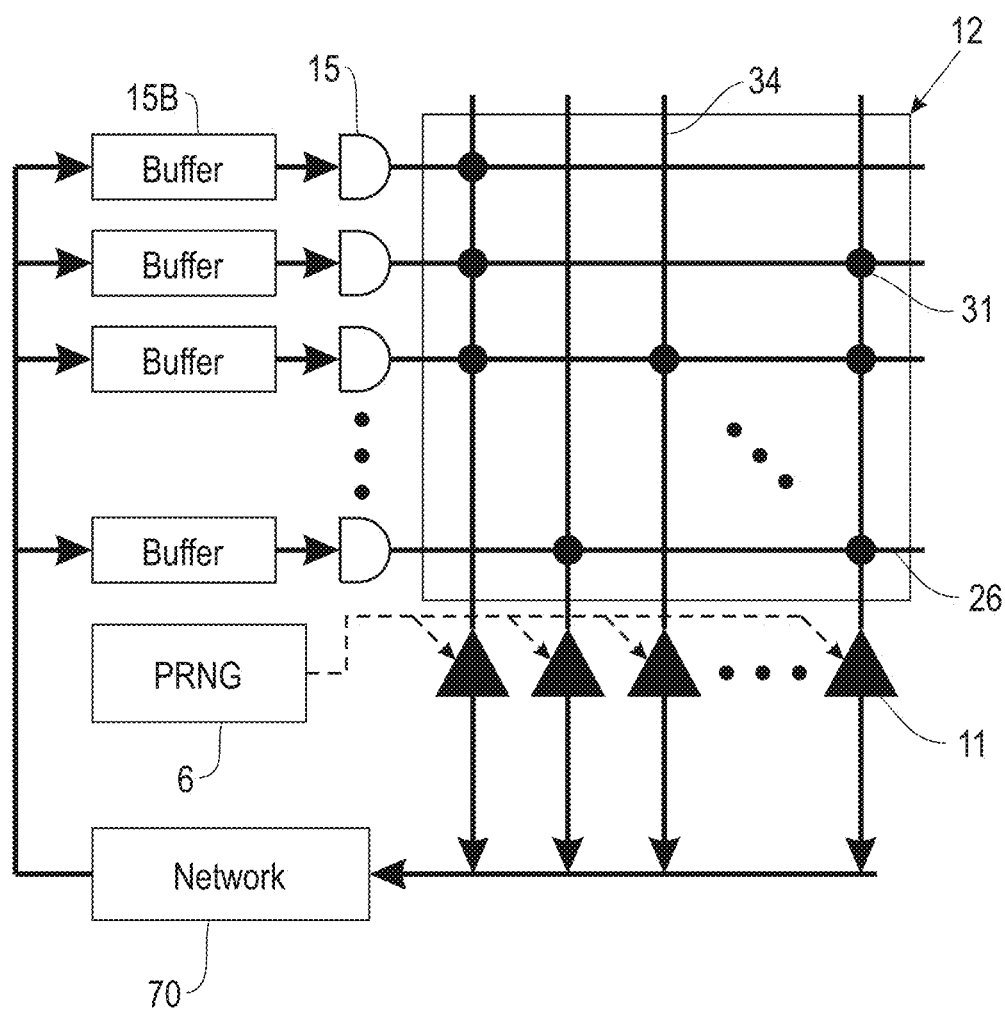
FIG. 1 illustrates an example neuromorphic core circuit, in accordance with an embodiment of the invention.

FIG. 1 illustrates an example neuromorphic core circuit 10, in accordance with an embodiment of the invention. The core circuit 10 comprises a plurality of electronic neurons ("neurons") 11 and a plurality of electronic incoming axons ("axons") 15. The neurons 11 and the axons 15 are interconnected via an m×n crossbar 12 comprising multiple electronic synapse devices ("synapses") 31, wherein m and n are integers greater than or equal to one. The crossbar 12 further includes multiple rows/axon paths 26 and multiple columns/dendrite paths 34. Each axon 15 is connected to a corresponding axon path 26 of the crossbar 12. Each neuron 11 is connected to a corresponding dendrite path 34 of the crossbar 12. Each synapse 31 interconnects an axon 15 to a neuron 11, wherein, with respect to the synapse 31, the axon 15 and the neuron 11 represent an axon of a pre-synaptic neuron and a dendrite of a post-synaptic neuron, respectively.

Each neuron 11 receives firing events via interconnected axons 15. Each neuron 11 has a corresponding neuronal state and a configurable set of neuronal properties and/or parameters. Based on received firing events, its current neuronal state and its neuronal properties and parameters, a neuron may generate a firing event according to a neuronal activation function. An example neuronal activation function may be leaky integrate-and-fire, as described in a publication titled "Cognitive Computing Building Block: A Versatile and Efficient Digital Neuron Model for Neurosynaptic Cores" by Cassidy, A.S. et al. published in International Joint Conference on Neural Networks, 2013.

In this specification, let the term target destination denote a destination for a firing event. Each firing event has a corresponding target destination that the firing event is delivered to. Let the term target axon denote an axon 15 that is a target destination. A firing event generated by a neuron 11 propagates to a target axon 15, wherein the target axon 15 may reside in the core circuit 10 as the neuron 11 or in a different core circuit 10 included in a neuromorphic core-based architecture comprising multiple interconnected core circuits 10.

In one embodiment of the invention, when neurons 11 generate a firing event, they maintain a postsynaptic-STDP (post-STDP) variable that decays. For example, in one embodiment, the decay period may be 50 ms. The post-STDP variable is used to achieve STDP by encoding the time since the last firing of an associated neuron 11. Such STDP is used to control long-term potentiation or "potentiation", which in this context is defined as increasing synaptic conductance. When axons 15 generate a firing event, they maintain a presynaptic-STDP (pre-STDP) variable that decays in a similar fashion as that of neurons 11.

Pre-STDP and post-STDP variables may decay according to exponential, linear, polynomial, or quadratic functions, for example. In another embodiment of the invention, variables may increase instead of decrease over time. In any event, a variable may be used to achieve STDP by encoding the time since the last firing of an associated neuron 11. STDP is used to control long-term depression or "depression", which in this context is defined as decreasing synaptic conductance. Note that the roles of pre-STDP and post-STDP variables can be reversed with pre-STDP implementing potentiation and post-STDP implementing depression.

An external two-way communication environment may supply sensory inputs and consume motor outputs. The neurons 11 and axons 15 are implemented using complementary metal-oxide semiconductor (CMOS) logic gates that receive firing events and generate a firing event according to the neuronal activation function. In one embodiment, the neurons 11 and axons 15 include comparator circuits that generate firing events according to the neuronal activation function. In one embodiment, the synapses 31 are implemented using one-bit static random-access memory (SRAM) cells. Neurons 11 that generate a firing event are selected one at a time, and the firing events are delivered to target axons 15, wherein the target axons 15 may reside in the same core circuit 10 or somewhere else in a larger system with many core circuits 10 (e.g., a neuromorphic core-based architecture comprising multiple interconnected core circuits 10).

As shown in FIG. 1, the core circuit 10 further comprises multiple axon buffers 15B. Each axon buffer 15B receives firing events and transmits them to target axons 15.

The core circuit 10 further comprises a pseudo-random number generator 6 used for implementing stochastic mode in each neuron 11.

Figure 2:
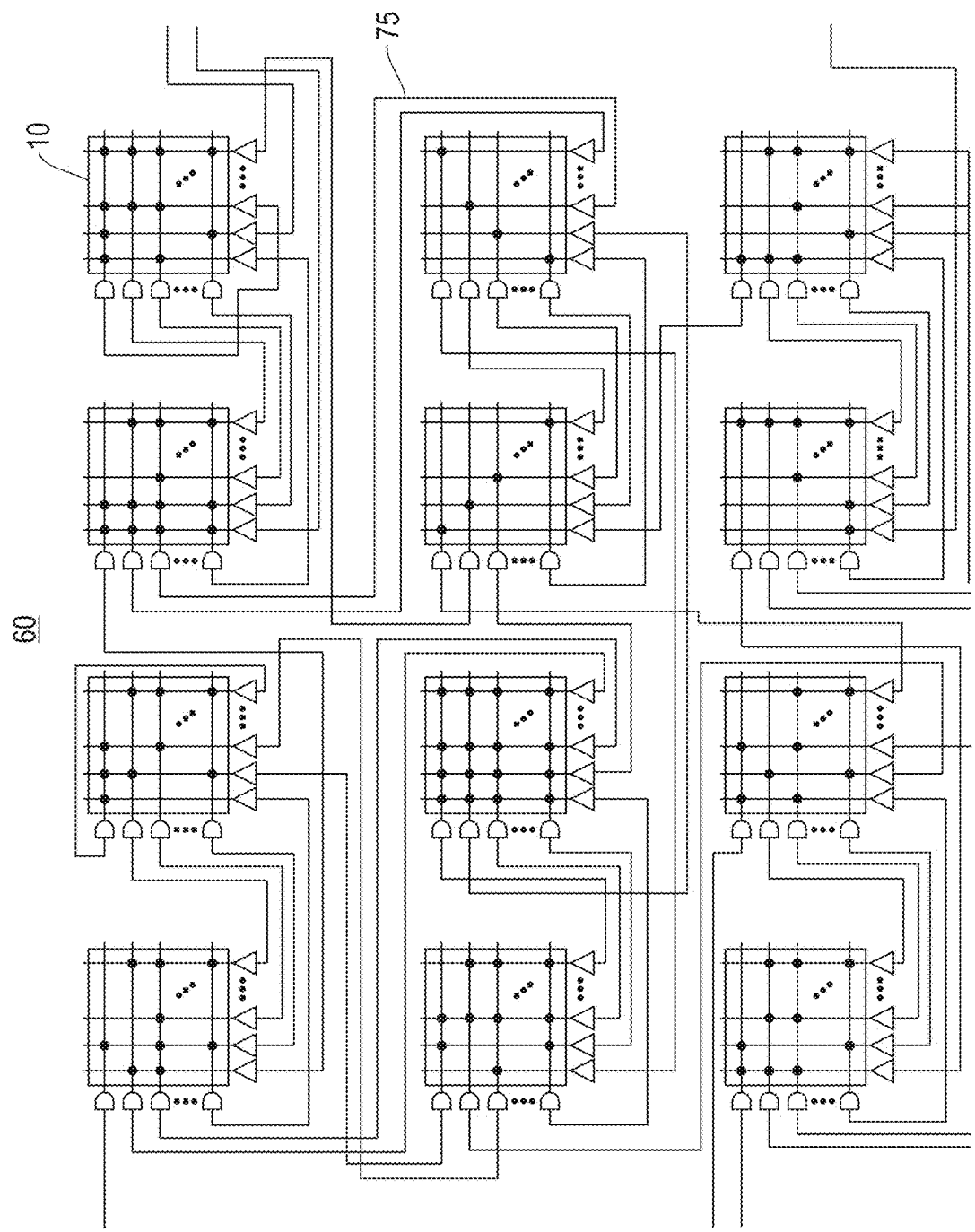
FIG. 2 illustrates an example neuromorphic core-based architecture including multiple interconnected core circuits, in accordance with an embodiment of the invention.

As shown in FIG. 1, the core circuit 10 is connected to a network interface 70 that facilitates routing of neuronal firing events among core circuits 10 using an interconnect network 75 (FIG. 2).

FIG. 2 illustrates an example neuromorphic core-based architecture 60 including multiple interconnected core circuits 10, in accordance with an embodiment of the invention. Each core circuit 10 utilizes an interconnect network 75 to pass along neuronal firing events to other core circuits 10.

A graph G is defined by a set of nodes V and a set of edges E. Specifically, let G=(V, E), wherein V={$v_1, \ldots, v_n$}. Let $e_{ij}$ denote an edge in the set of edges E that interconnects a node $v_i$ in the set of nodes V with another node $v_j$ in the set of nodes V. There are multiple types of graphs.

For example, a graph G may be a directed graph, wherein each edge $e_{ij}$ has a corresponding direction. Specifically, the set of edges E for a directed graph comprises a set of ordered pairs. Let $e_{ij}=(v_i, v_j)$, wherein $e_{ij} \neq e_{ji}$. If both $e_{ij}$ and $e_{ji}$ are in the set of edges E, a bidirectional edge interconnects the node $v_i$ with the node $v_j$.

Let A denote a corresponding adjacency matrix for a graph G, wherein A is an n×n matrix. Let $a_{ij}$ generally denote an entry of the matrix A that represents the number of edges between nodes $v_i$ and $v_j$. If the graph G is a directed graph, $a_{ij}$ represents the number of edges from node $v_i$ to node $v_j$. In one embodiment, $a_{ij}$ is either 0 or 1.

As another example, a graph G may be a weighted graph. Specifically, let G=(V, E, W), where W is an n×n weight matrix. Let $w_{ij}$ generally denote an entry of the matrix A that represents the weight of edge $e_{ij}$ between nodes $v_i$ and $v_j$. Each edge $e_{ij}$ has a corresponding weight $w_{ij}$. In one embodiment, the range of weights that any edge $e_{ij}$ may be associated with is dynamic.

As another example, a graph G may be a bipartite graph. Specifically, let G=(S, T, E), wherein S is a first set of nodes representing source nodes, wherein T is a second set of nodes representing target nodes, and wherein each edge $e_{ij}$ is between a source node $v_i$ in the first set of nodes S and a target node $v_j$ in the second set of nodes T.

In this specification, let { } represent a set. Let |{ }| represent the cardinality of a set { }. Let $F_{in}(v_j)$ denote the number of incoming edges to a target node $v_{in}$, wherein $F_{in}(v_j)=|\{e_{ij}|e_{ij} \text{ in } E\}|$. Let $F_{out}(v_i)$ denote the number of outgoing edges from a source node $v_i$, wherein $F_{out}(v_i)=|\{e_{ij}|e_{ij} \text{ in } E\}|$. Fan-in of a graph G is equal to the largest fan-in among all target nodes of the graph G. Fan-out of a graph G is equal to the largest fan-out among all source nodes of the graph G. Fan-in and fan-out of a graph G may also be referred to as in-degree and out-degree, respectively.

Embodiments of the present invention provide a method and a system for mapping a graph onto a neuromorphic core-based architecture. The graph may be a weighted graph with any fan-in and fan-out, and with a high dynamic range of weights. One embodiment provides a method and system for mapping a bipartite graph to a neuromorphic architecture.

Figure 3:
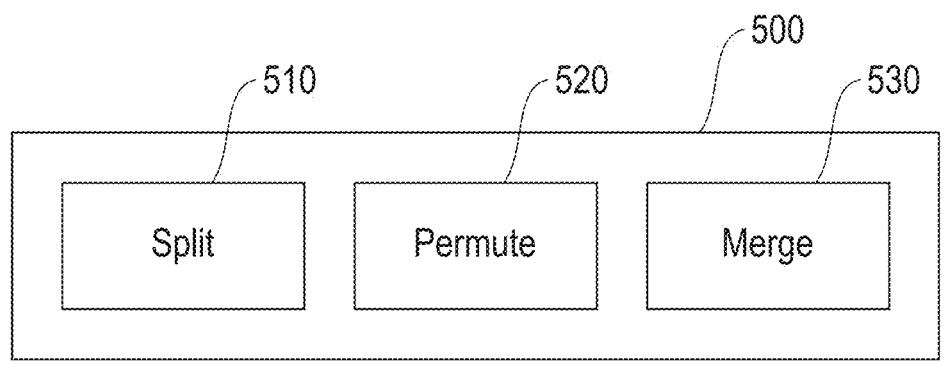
FIG. 3 illustrates a high-level block diagram of the neural network circuit in FIG. 2, in accordance with an embodiment of the invention.

FIG. 3 illustrates a block diagram of a system 500 for mapping a bipartite graph onto a neuromorphic architecture, in accordance with an embodiment of the invention. The system 500 implements a split-permute-merge approach when mapping a bipartite graph onto a neuromorphic architecture. In one embodiment, the system 500 includes a split unit 510, a permute unit 520 and a merge unit 530. The split unit 510 and the merge unit 530 implement fan-in and fan-out of a bipartite graph. Specifically, for each edge $e_{ij}$ of a weighted bipartite graph G (i.e., each edge $e_{ij}$ has a corresponding weight $w_{ij}$), the split unit 510 and the merge unit 530 allocate one splitter construct ("splitter") 550 (FIG. 5) and one merger construct ("merger") 560 (FIG. 6), respectively. The weight $w_{ij}$ corresponding to the edge $e_{ij}$ may be implemented based on a synaptic weight and a threshold parameter of the splitter neuron 550, and a weight associated with the merger neuron 560, thereby permitting a high dynamic range of weights and providing a larger space for mapping weight matrices onto a core circuit.

The permute unit 520 applies a permutation operation comprising a one-to-one mapping between a set of sources nodes S and a set of target nodes T. Specifically, each splitted output of a source node $s_i$ in the set of source nodes S is connected to exactly one merged input of a target node $t_j$ in the set of target nodes T.

Figure 4:
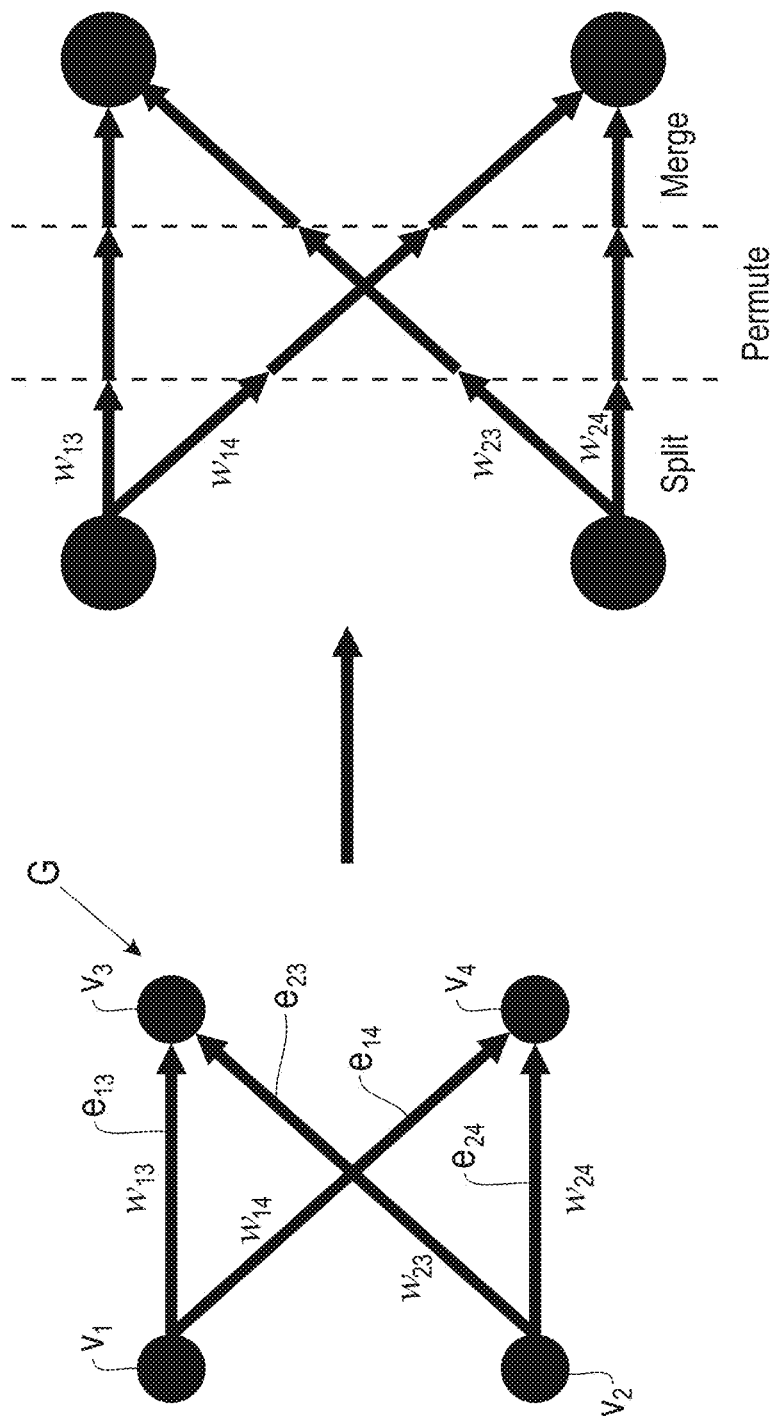
FIG. 4 illustrates applying the split-permute-merge approach of the system to an example weighted bipartite graph, in accordance with an embodiment of the invention.

FIG. 4 illustrates applying the split-permute-merge approach of the system 500 to an example weighted bipartite graph G, in accordance with an embodiment of the invention. As shown in FIG. 4, the weighted bipartite graph G comprises multiple nodes, such as a first node $v_1$, a second node $v_2$, a third node $v_3$, and a fourth node $v_4$. The weighted bipartite graph G comprises multiple weighted edges, such as a first edge $e_{13}$ with corresponding weight $w_{13}$ connecting the first node $v_1$ to the third node $v_3$, a second edge $e_{14}$ with corresponding weight $w_{14}$ connecting the first node $v_1$ to the fourth node $v_4$, a third edge $e_{23}$ with corresponding weight $w_{23}$ connecting the second node $v_2$ to the third node $v_3$, and a fourth edge $e_{24}$ with corresponding weight $w_{24}$ connecting the second node $v_2$ to the fourth node $v_4$. In this example, the set of source nodes is S={$v_1$, $v_2$}, the set of target nodes is T={$v_3$, $v_4$}, the set of edges is E={$e_{13}$, $e_{14}$, $e_{23}$, $e_{24}$}, and the weights matrix is W=[$e_{13}$, $e_{14}$; $e_{23}$, $e_{24}$].

The split unit 510 allocates a first splitter neuron 550 to the first edge $e_{13}$ and the second edge $e_{14}$, and a second splitter neuron 550 to the third edge $e_{23}$ and the fourth edge $e_{23}$. The merge unit 530 allocates a first merger neuron 560 to the first edge $e_{13}$ and the second edge $e_{14}$, and a second merger neuron 560 to the third edge $e_{23}$ and the fourth edge $e_{23}$.

In one embodiment, using a TrueNorth neuromorphic architecture as described in the above-referenced publication titled "Cognitive Computing Building Block: A Versatile and Efficient Digital Neuron Model for Neurosynaptic Cores", weights may be implemented at the split operation. When weights are implemented at the split operation, the weights are independently set on each splitter neuron 550. This configuration permits rational weight values to be implemented, with a nominator in the range of [−255, 255] and a denominator in the range of [1,$2^{18}$]. For example, a synaptic weight of a splitter neuron 550 may be set to a nominator value, and a threshold parameter of the splitter neuron 550 may be set to a denominator value. Extending the dynamic range of synaptic weights from integer values to rational values using splitter neurons 550 is one advantage of this invention. In another embodiment, using a different neuromorphic architecture, synaptic weights may be generalized.

Figure 5:
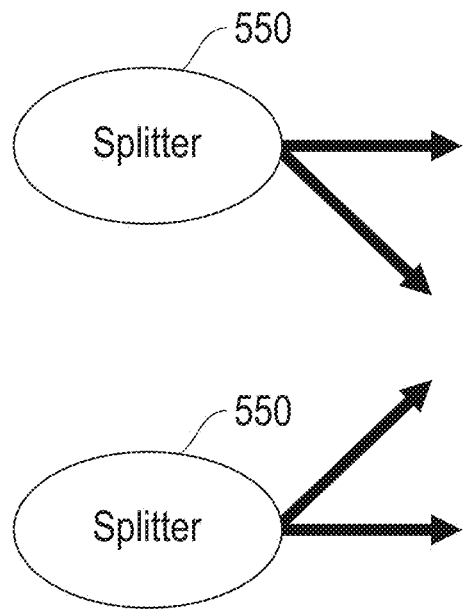
FIG. 5 illustrates example splitter neurons, in accordance with an embodiment of the invention.

FIG. 5 illustrates example splitter neurons 550, in accordance with an embodiment of the invention. In one example implementation, each splitter neuron 550 includes an axon 15 interconnected to multiple neurons 11 via a crossbar 12. In this specification, let the term common axon denote an axon 15 that is interconnected to multiple neurons 11. Neurons 11 that receive input spikes from a common axon 15 duplicate/replicate the input spikes received, and sends the duplicated/replicated input spikes to multiple target destinations (e.g., target axons 15). A splitter neuron 550 increases the effective fan-out of a neuron 11. When a desired fan-out exceeds the dimensionality of a crossbar 12, multi-level splitting may be implemented, as described in detail later herein.

Figure 6:
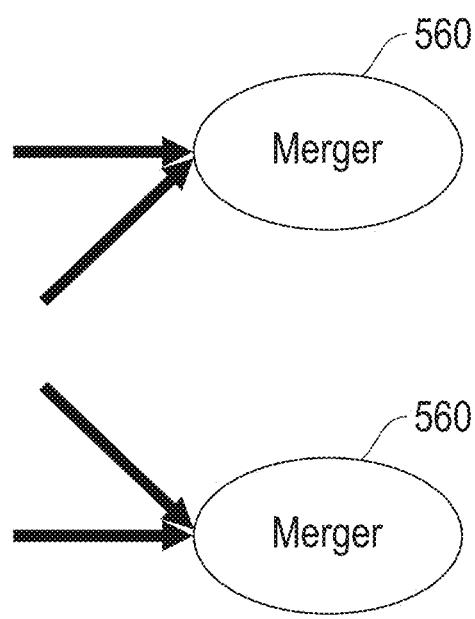
FIG. 6 illustrates example merger neurons, in accordance with an embodiment of the invention.

FIG. 6 illustrates example merger neurons 560, in accordance with an embodiment of the invention. Each merger neuron 560 includes a neuron 11 that receives input spikes from multiple axons 15, and sums the input spikes received. A merger neuron 560 increases the effective fan-in of a neuron 11. When a desired fan-in exceeds the dimensionality of a crossbar 12, multi-level merging may be implemented, as described in detail later herein.

Each merger neuron 560 implements a merging function, such as an OR function, an AND function, a SUM function, or any other merging function. For example, in one embodiment, an OR function may be implemented using a bus OR property of a single axon 15 (i.e., no additional independent axons 15 are required).

The permute unit 520 facilitates permutation connectivity between an output set of splitters of sources nodes S, comprising all the output neurons of the splitters of source nodes S, and an input set of the mergers of target nodes T, comprising of all the axons of all the mergers of target nodes T. The permutation connectivity may be specified using a permutation vector P, such that T=P(S), wherein j=P(i)

denotes that a target input $t_j$ in the set of inputs to target nodes is connected to a source neuron of a node $s_i$ in the set of source nodes S.

The permutation operation performed by the permute unit 520 is merely a wiring transformation. In one embodiment it is implemented by configuring the destination of a neuron to be the desired target axon, and therefore does not require any additional resources. In one example implementation, the permutation operation may be applied when connecting source nodes to target nodes by applying a permutation table on the wiring order. For example, in a corelet, this may be implemented using adapters T.busFrom(S, P) or S.busTo(T, $P^{-1}$), wherein $P^{-1}$ is the inverse permutation. As described in detail later herein, a corelet is a structural description of one or more core circuits 10.

Figure 17:
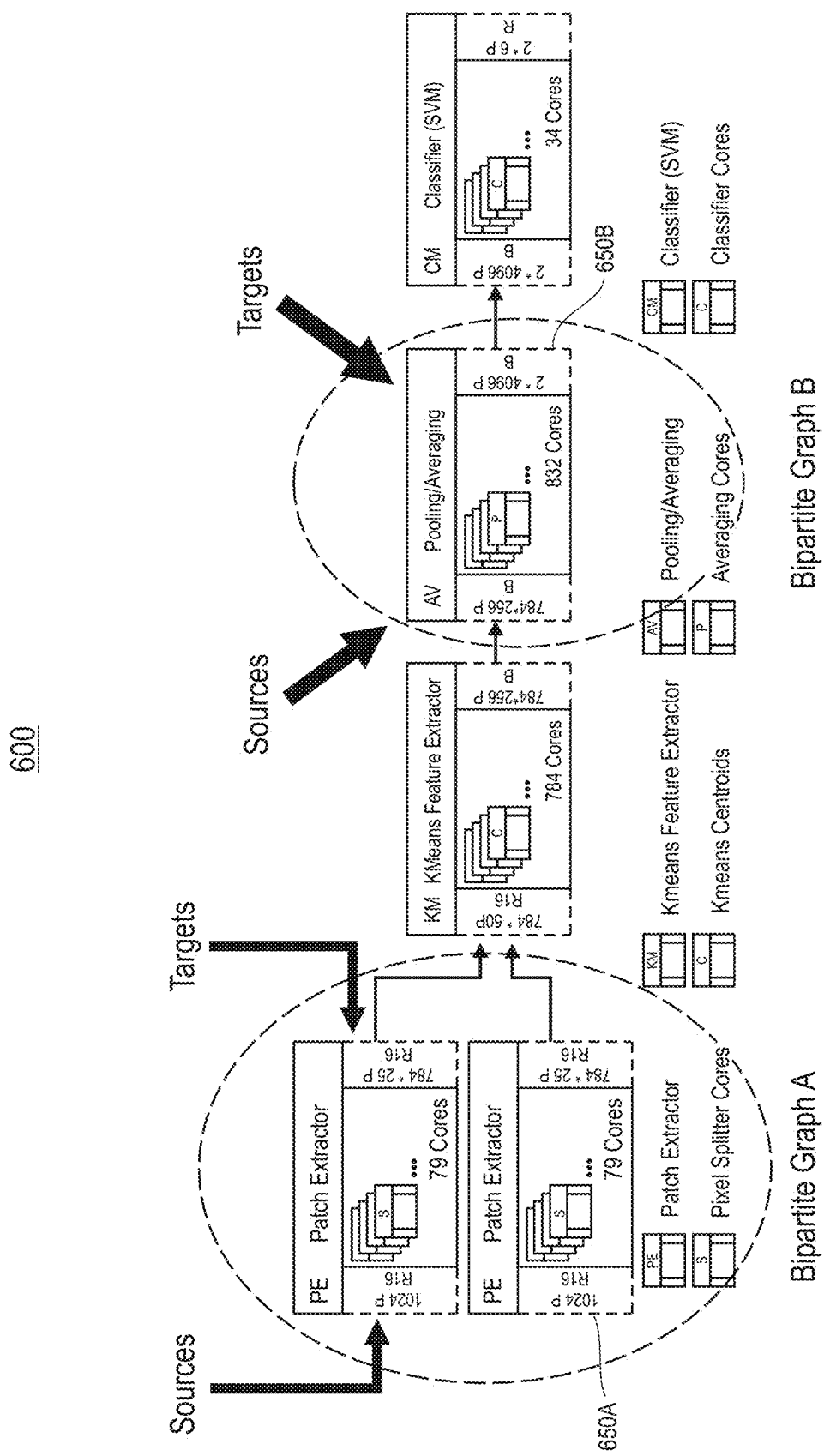
FIG. 17 illustrates a K-Means feature extraction system, in accordance with an embodiment of the invention.

In another example implementation, two neurosynaptic networks may be connected via connectors. A connector represents an ordered list of source nodes and target nodes. A connector may comprise one or more permutation vectors, wherein each permutation vector may be set by a user of the connector. Each side of a connector may be implemented by a different user who specifies a desired permutation for the side, resulting in a permutation-of-a-permutation (i.e., a composition of two permutations). Complex permutations may be composed by cascading multiple simpler permutations. Implementing a permutation within a connector may reduce code complexity. As shown in FIG. 17, a connector may be an input connector 650 A or an output connector 650B.

Figure 7:
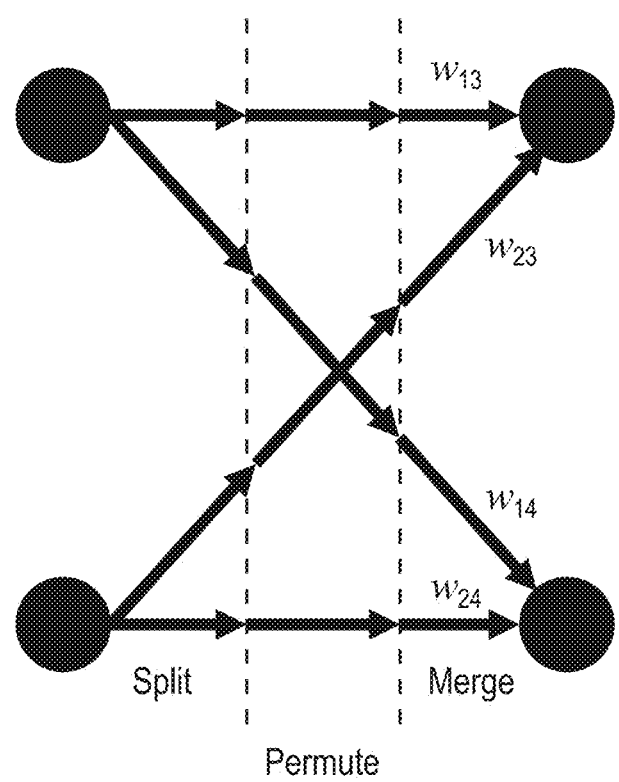
FIG. 7 illustrates a representation of weights of a bipartite graph at a merge operation, in accordance with an embodiment of the invention.

FIG. 7 illustrates a representation of weights of a bipartite graph G at a merge operation, in accordance with an embodiment of the invention. Unlike in FIG. 4 where each weight $w_{ij}$ corresponding to each edge $e_{ij}$ is represented at the split operation, in FIG. 7 each weight $w_{ij}$ corresponding to each edge $e_{ij}$ is represented at the merge operation as a weighted sum or a weighted max of a set of inputs. Representing weights at the merge operation, however, might restrict the weights to weights that may be represented by a single neuron 11 on a core circuit 10.

For example, in one embodiment, the synaptic weights are integer values. In one neuromorphic core-based architecture the number of different weights for each neuron is limited to four weights in a lookup table. The axon type may be used as an index into a neuron's lookup table, as described in the above-referenced publication titled "Cognitive Computing Building Block: A Versatile and Efficient Digital Neuron Model for Neurosynaptic Cores". This limits the size of a corresponding weight lookup table for each neuron. Further, as the indices in each weight lookup table are shared across all neurons on a core circuit 10, the space of possible weight matrices that may be mapped onto a core circuit 10 is limited.

In one embodiment, to overcome this limitation to the range of possible weights, for each edge $e_{ij}$, a splitter neuron 550 may be used to code a corresponding weight $w_{ij}$. Each weight $w_{ij}$ may be implemented in accordance with equation (1) provided below:

$$w_{ij}=S_0/\alpha \qquad (1),$$

wherein $S_0$ denotes a synaptic weight, wherein a denotes a neuron threshold parameter, and wherein a neuron is set to work in a liner mode where a membrane potential of the neuron is decreased by the neuron threshold parameter α after each spike generated by the neuron.

The system 500 implements the mapping of a bipartite graph G onto a core-based neuromorphic architecture as follows: For each source node $s_i$ in the set of source nodes S with a corresponding degree $d(s_i)$, create a splitter of size $d(s_i)$, wherein the set of splitters outputs is denoted as S'. For each target node $t_j$ in the set of target nodes T with a corresponding degree $d(t_j)$, create a merger of size $d(t_j)$, wherein the set of mergers inputs is denoted as T'. Connect the set of splitters outputs S' to the set of mergers inputs T' using a permutation. For each edge $e_{ij}$, implement a corresponding weight $w_{ij}$ as a rational weight using the splitter neuron allocated to the edge $e_{ij}$ and equation (1) provided above.

Figure 8:
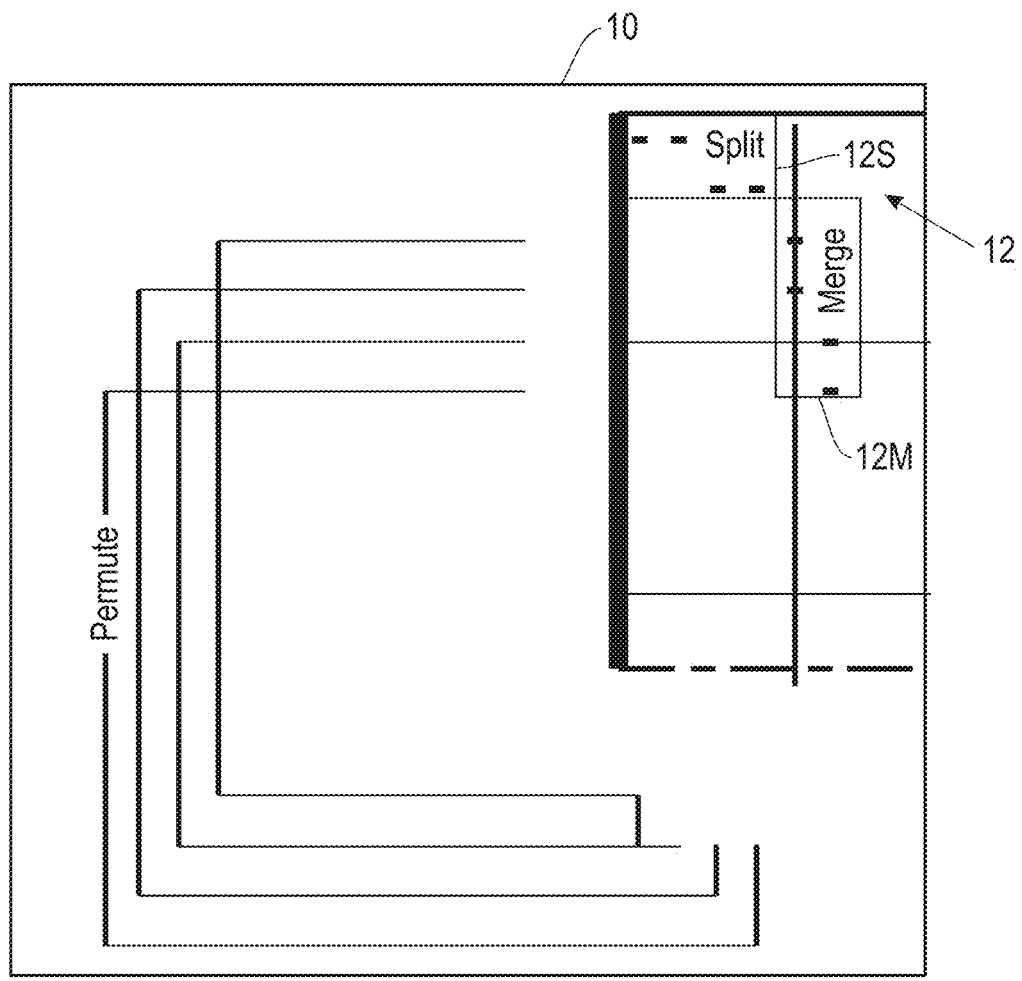
FIG. 8 illustrates the mapping of the bipartite graph in FIG. 4 onto a core circuit, in accordance with an embodiment of the invention.

FIG. 8 illustrates the mapping of the bipartite graph G in FIG. 4 onto a core circuit 10, in accordance with an embodiment of the invention. A splitter neuron 550 is bounded to neurons, requiring more neurons 11 than axons 15. By comparison, a merger neuron 560 is bounded to axons, requiring more axons 15 than neurons 11. When splitter neurons 550 and merger neurons 560 are implemented on the same core circuit 10, both axon utilization and neuron utilization of the core circuit 10 are simultaneously improved.

For example, to combine a number of splitter neurons 550 and merger neurons 560 on each core circuit 10, each core circuit 10 may be programmed using one or more corelets. A corelet is a structural description of one or more core circuits 10. In one embodiment, a corelet is a static configuration file for programming a portion (i.e., a fraction) of a core circuit 10, a core circuit 10, or at least two corelets representing multiple interconnected core circuits 10. Corelets may be composed in a hierarchical fashion, such that a corelet may be used to program two or more corelets representing multiple interconnected core circuits 10.

The balancing of splitter neurons 550 and merger neurons 560 on a core circuit 10 may be done automatically (e.g., using an integer programming optimization algorithm).

In FIG. 8, a combination of splitter neurons 550 and merger neurons 560 are programmed onto a core circuit 10. Specifically, a first portion/fraction 12S of a crossbar 12 of the core circuit 10 is programmed as splitter neurons 550, and a second portion/fraction 12M of the crossbar 12 is programmed as merger neurons 560. The connectors 75 implement a permutation connectivity between source nodes and target nodes.

The system 500 may also be used to map a general (non-bipartite) graph to a neuromorphic architecture.

Figure 9:
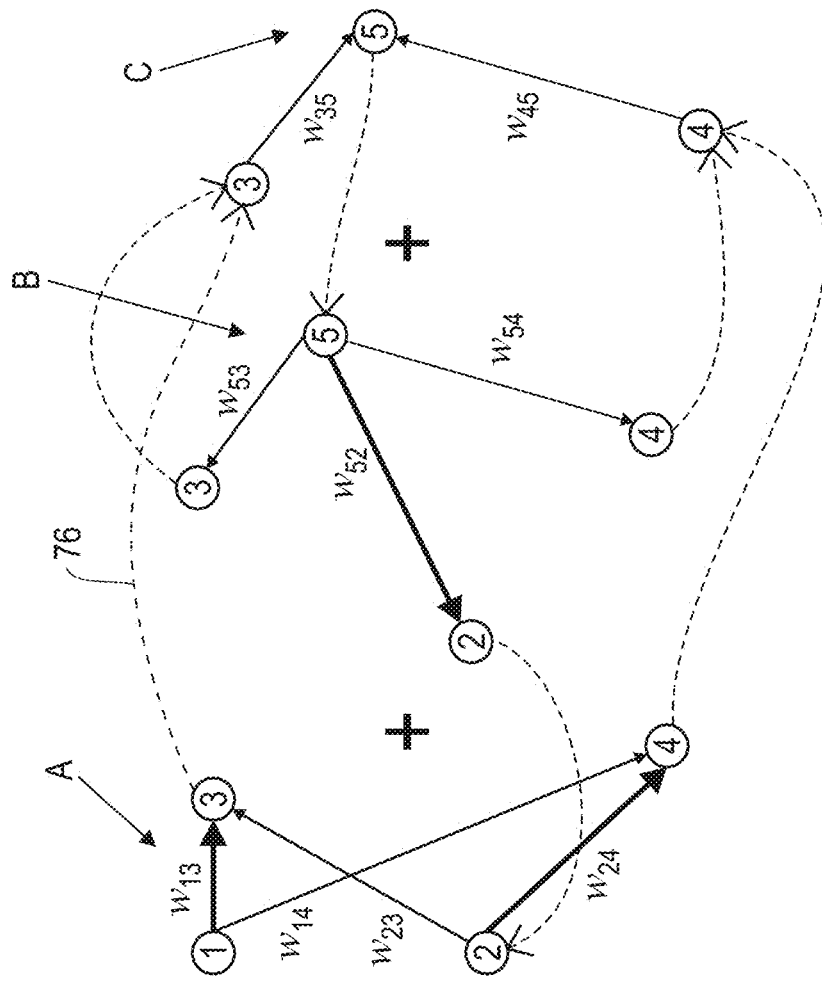
FIG. 9 illustrates applying the split-permute-merge approach of the system to an example weighted general graph, in accordance with an embodiment of the invention.
Figure 9:
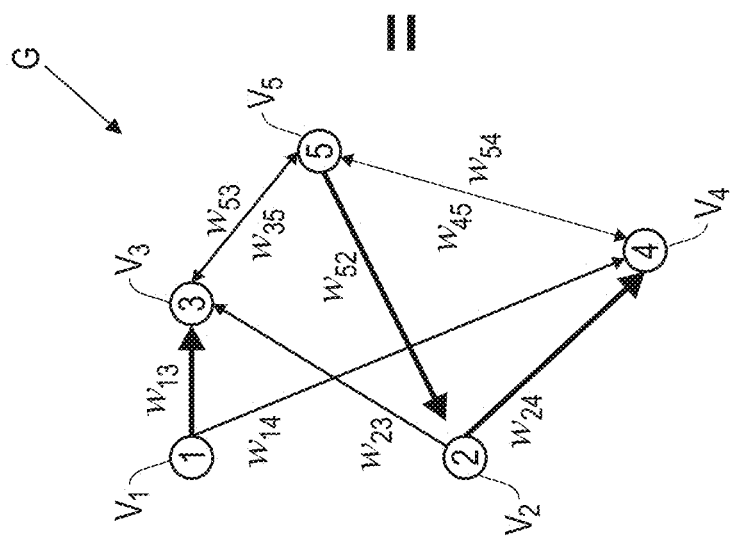

FIG. 9 illustrates applying the split-permute-merge approach of the system 500 to an example weighted general graph G, in accordance with an embodiment of the invention. As shown in FIG. 9, the weighted general graph G comprises multiple nodes, such as a first node $v_1$, a second node $v_2$, a third node $v_3$, a fourth node $v_4$ and a fifth node $v_5$. The weighted general graph G comprises multiple weighted edges, such as a first edge with corresponding weight $w_{13}$ connecting the first node $v_1$ to the third node $v_3$, a second edge with corresponding weight $w_{14}$ connecting the first node $v_1$ to the fourth node $v_4$, a third edge with corresponding weight $w_{23}$ connecting the second node $v_2$ to the third node $v_3$, a fourth edge with corresponding weight $w_{24}$ connecting the second node $v_2$ to the fourth node $v_4$, a fifth edge with corresponding weight $w_{35}$ connecting the third node $v_3$ to the fifth node $v_5$, a sixth edge with corresponding weight $w_{53}$ connecting the fifth node $v_5$ to the third node $v_3$, a seventh edge with corresponding weight $w_{52}$ connecting the fifth node $v_5$ to the second node $v_2$, an eight edge with corresponding weight $w_{45}$ connecting the fourth node $v_4$ to the fifth node $v_5$, and a ninth edge with corresponding weight $W_{54}$ connecting the fifth node vs to the fourth node $V_4$.

The system 500 decomposes the weighted general graph G into a combination of multiple weighted bipartite sub-graphs, such as a first weighted bipartite sub-graph A, a second weighted bipartite sub-graph B, and a third weighted bipartite sub-graph C. The system 500 maps each weighted bipartite sub-graph onto a core-based neuromorphic architecture. One or more additional edges 76 interconnect the weighted bipartite sub-graphs to each other to form the complete implementation of the general graph G.

Table 1 below provides example pseudocode for decomposing a general graph G into a combination of K bipartite sub-graphs.

TABLE 1

1. Set i=1
2. Initialize an empty source set $S_i$, a target set $T_i$, an empty edges sets $B_i$ and $C_i$
3. Select a node v from V\($S_i$ + $T_i$) which has an outgoing edge in E\$C_i$     % '\' denotes the set difference.
4. Insert v to $S_i$      %Each node v appears in at most one set $S_i$, wherein i = 1...K
5. For each edge e=v–>u in E\$C_i$,
    insert u into $T_i$, insert e to $B_i$, insert all edges u–>* and *–>v to $C_i$.
6. If any nodes left in V\( $S_i$ + $T_i$), return to 3
7. Output the bipartite sub-graph $G_i$ =($S_i$, $T_i$, $B_i$).
8. Let E=E\$B_i$      % hereby removing all edges which are in $G_i$
9. If E is not empty, then i=i+1 and return to 2
10. Output K=i % the number of sub-graphs To compose the general graph G from the bipartite graphs, connect each target node in the target set $T_j$ to a corresponding source node in the source set $S_i$ with an additional edge 76.

Figure 10:
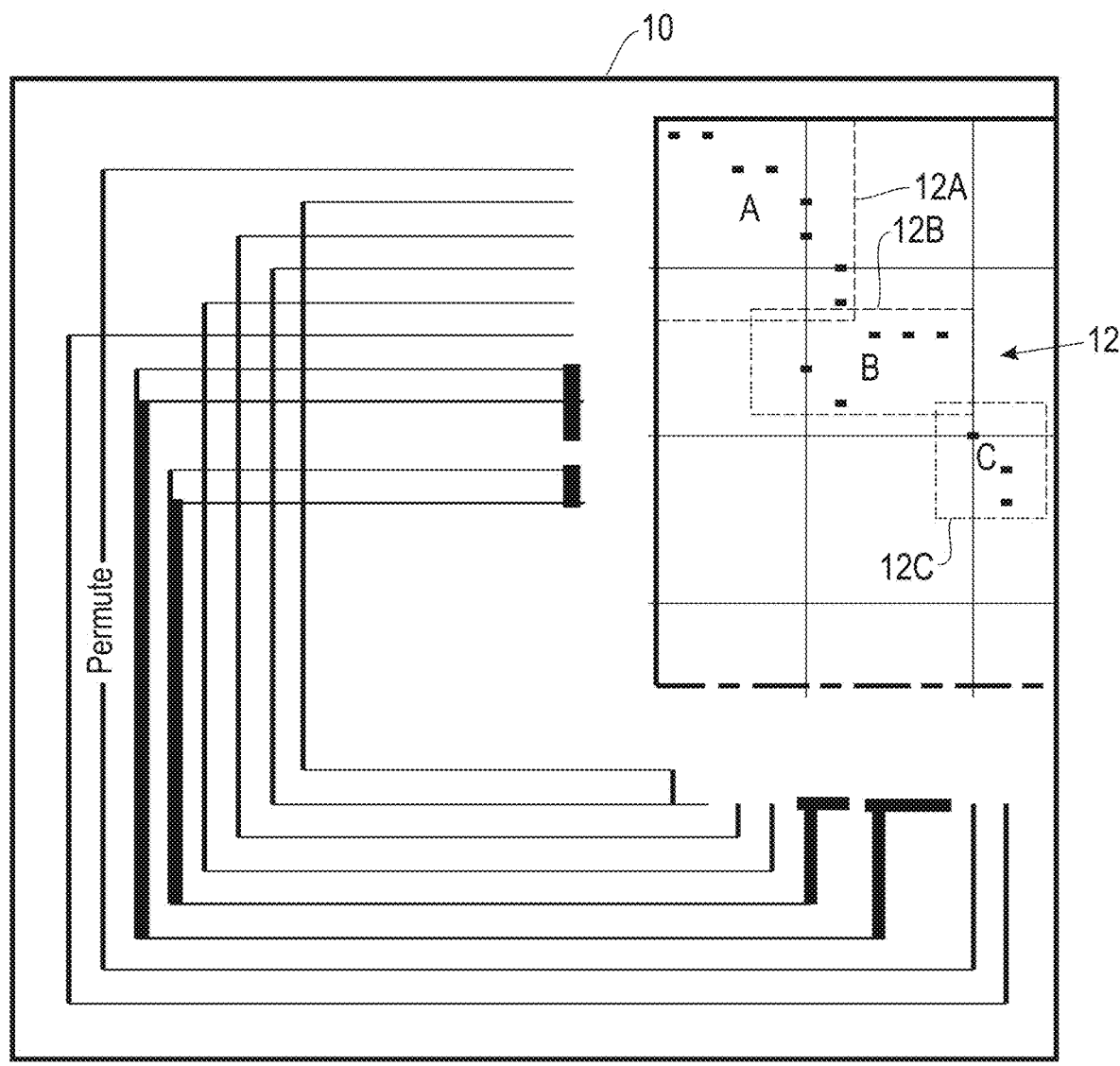
FIG. 10 illustrates the mapping of the general graph in FIG. 9 onto a core circuit, in accordance with an embodiment of the invention.

FIG. 10 illustrates the mapping of the general graph G in FIG. 9 onto a core circuit 10, in accordance with an embodiment of the invention. Specifically, a first portion/fraction 12A of a crossbar 12 of the core circuit 10 is programmed as a combination of splitter neurons 550 and merger neurons 560 for the bipartite sub-graph A, a second portion/fraction 12B of the crossbar 12 is programmed as a combination of splitter neurons 550 and merger neurons 560 for the bipartite sub-graph B, and a third portion/fraction 12C of the crossbar 12 is programmed as a combination of splitter neurons 550 and merger neurons 560 for the bipartite sub-graph C.

Figure 11:
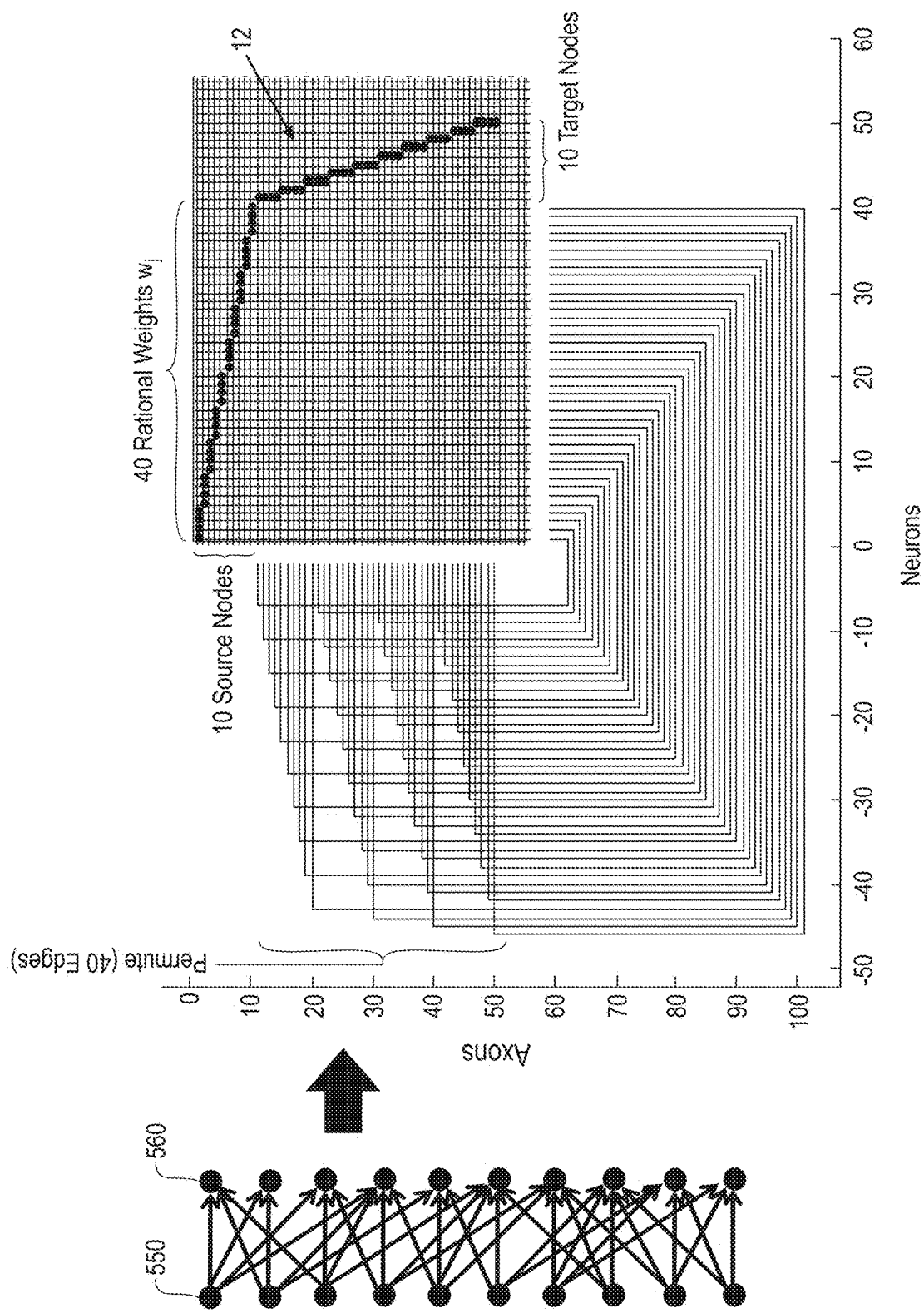
FIG. 11 illustrates the mapping of a bipartite graph onto a core circuit with four-way splitters and four-way mergers, in accordance with an embodiment of the invention.

FIG. 11 illustrates the mapping of a bipartite graph G onto a core circuit 10 with four-way splitter neurons 550 and four-way merger neurons 560, in accordance with an embodiment of the invention. The core circuit 10 implements a bipartite graph G with ten source nodes, ten target nodes, and forty edges, wherein each source node is connected to four target nodes. An independent rational weight is assigned for each of the forty edges.

Figure 12:
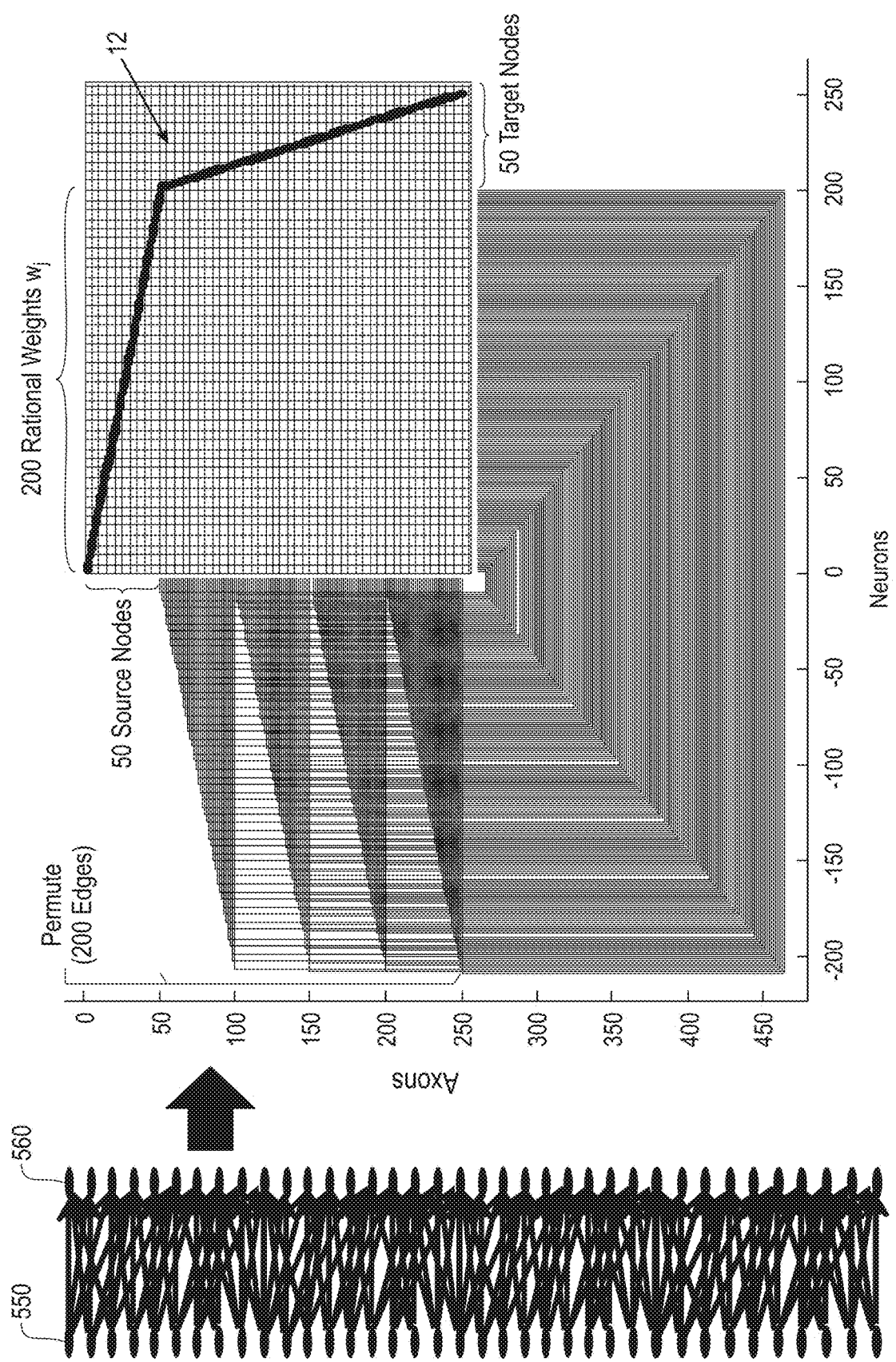
FIG. 12 illustrates a mapping of another bipartite graph onto a core circuit with four-way splitters and four-way mergers, in accordance with an embodiment of the invention.

FIG. 12 illustrates a mapping of another bipartite graph G onto a core circuit 10 with four-way splitter neurons 550 and four-way merger neurons 560, in accordance with an embodiment of the invention. The core circuit 10 implements a bipartite graph G with fifty source nodes, fifty target nodes, and two hundred edges, wherein each source node is connected to four target nodes. An independent rational weight is assigned for each of the two hundred edges.

Some nodes and some partial computations may result in different delays (i.e., latency). The variability in delays may affect semantics of output. In one embodiment, a user may designate one or more subsets of the graph's nodes as "synchronous", and add one or more common inputs to the synchronous nodes (e.g., a reset input, a trigger input, a gating input, etc.). For example, when the reset input receives a spike, all neurons receiving the spike will reset. In one embodiment, a node may appear as both a source node and a target node. In such a case, the reset input may connect to all these instances.

Figure 13:
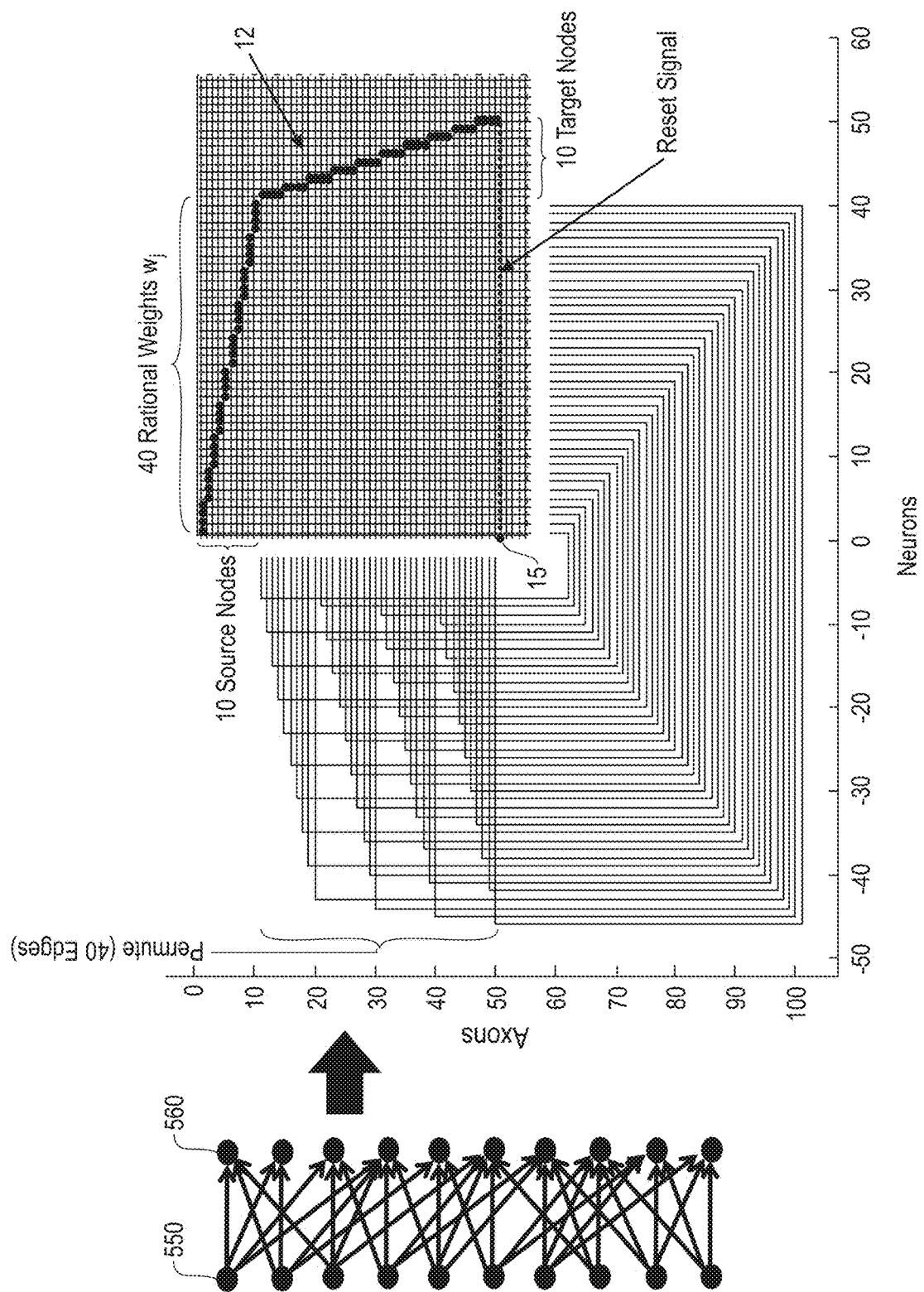
FIG. 13 illustrates the mapping of a bipartite graph onto a core circuit with four-way splitters, four-way mergers and a reset input, in accordance with an embodiment of the invention.

FIG. 13 illustrates the mapping of a bipartite graph G onto a core circuit 10 with four-way splitter neurons 550, four-way merger neurons 560 and a reset input, in accordance with an embodiment of the invention. The core circuit 10 implements a bipartite graph G with ten source nodes, ten target nodes, and forty edges, wherein each source node is connected to four target nodes. An independent rational weight is assigned for each of the forty edges. One axon 15 of the core circuit 10 is configured as a reset axon that provides reset input/reset signal. The reset axon may be assigned a separate axon type and a separate synaptic weight for each splitter neuron 550, wherein the axon type and synaptic weights assigned may be the example axon types and synaptic weights described in the above-referenced publication titled "Cognitive Computing Building Block: A Versatile and Efficient Digital Neuron Model for Neurosynaptic Cores".

Figure 14:
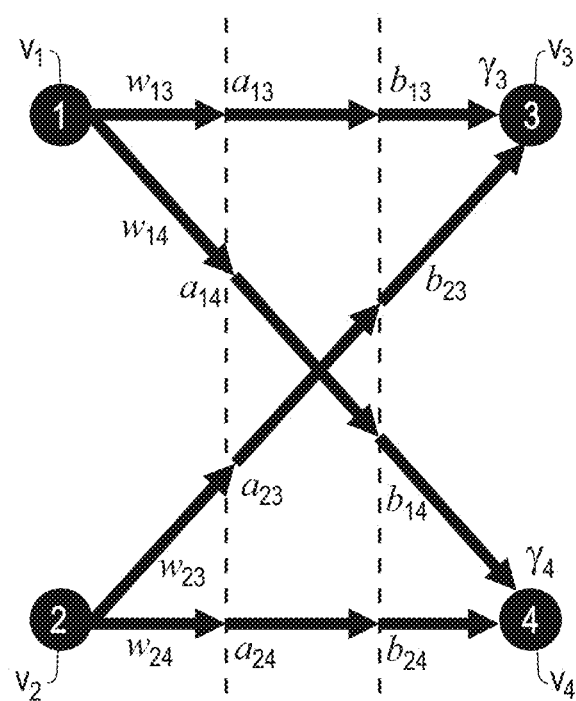
FIG. 14 illustrates another representation of weights of a bipartite graph, in accordance with an embodiment of the invention.

FIG. 14 illustrates another representation of weights of a bipartite graph G, in accordance with an embodiment of the invention. In one embodiment, the dynamic range of weights for the bipartite graph G may be extended by using both weights on splitter neurons 550 and merger neurons 560. Each weight $w_{ij}$ may be implemented in accordance with equation (2) provided below:

$$w_{ij} = S_{ij} b_{ij} / \alpha_{ij} \gamma_j$$

wherein $S_{ij}$ denotes a synaptic weight of a splitter, wherein $\alpha_{ij}$ denotes a neuron threshold parameter of the splitter, wherein denotes a synaptic weight of a merger, $\gamma_j$ denotes a neuron threshold parameter of the merger In one embodiment, $b_{ij}=1$ and $\gamma_j=1$.

In one embodiment, when $w_{ij}$ is small, $S_{ij}$ and $\gamma_j$ may be increased to $S'_{ij}$ and $\gamma'_j$ in accordance with equation (3) provided below:

$$\begin{aligned} w_{ij} &= S_{ij} b_{ij} / \alpha_{ij} \gamma_j \\ &= (k S_{ij}) b_{ij} / \alpha_{ij} (k \gamma_j) \\ &= S'_{ij} b_{ij} / \alpha_{ij} \gamma'_j, \end{aligned} \quad (3)$$

such that the number of spikes between the splitter and the merger is about k times larger for the same input, thereby extending dynamic range of weights.

In one embodiment, when $w_{ij}$ is large, $b_{ij}$ and $\alpha_{ij}$ may be increased to $b'_{ij}$ and $\alpha'_{ij}$ in accordance with equation (4) provided below:

$$\begin{aligned} w_{ij} &= S_{ij} b_{ij} / \alpha_{ij} \gamma_j \\ &= S_{ij} (k b_{ij}) / (k \alpha_{ij}) \gamma_j \\ &= S_{ij} b'_{ij} / \alpha'_{ij} \gamma_j, \end{aligned} \quad (4)$$

such that the number of spikes between the splitter and the merger is about k times smaller for the same input.

Stochasticity may be used in various graph applications, especially with large-scale graphical models, such as Recurrent Boltzmann Machine (RBM), Liquid State Machine (LSM), etc. Stochasticity may be applied to nodes and/or the edges of a graph G. For example, in one embodiment, neurons may be set to a stochastic mode to implement node stochasticity. In another embodiment, stochastic synapses may be used in the merge operation to implement stochastic edge weights.

Split, merge and combinations of split and merge may be parameterized to allow scalability (e.g., vector length, image size, number of classes and more), variable edge density (e.g., a random graph, where edges are present with probability p), etc. Depending on the nature of a bipartite graph G, fan-out and/or fan-in of the bipartite graph G may be larger than the size of a core circuit 10. A splitter or merger may be built hierarchically, allowing for an exponentially larger number of inputs or outputs, respectively.

Figure 15:
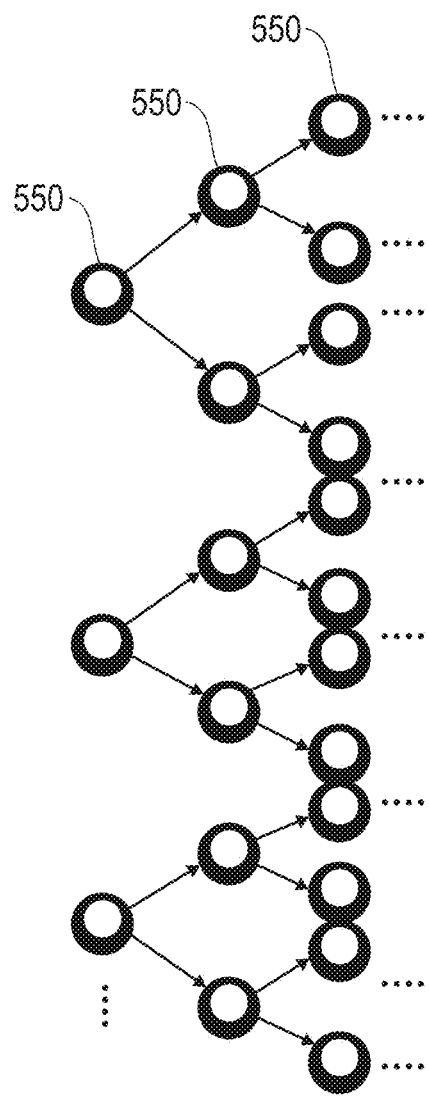
FIG. 15 illustrates multi-level splitting, in accordance with an embodiment of the invention.

FIG. 15 illustrates multi-level splitting, in accordance with an embodiment of the invention. Splitter neurons 550 may be arranged to implement a hierarchical split operation. For example, as shown in FIG. 15, multiple splitter neurons 550 may be arranged into a three-level split operation.

Figure 16:
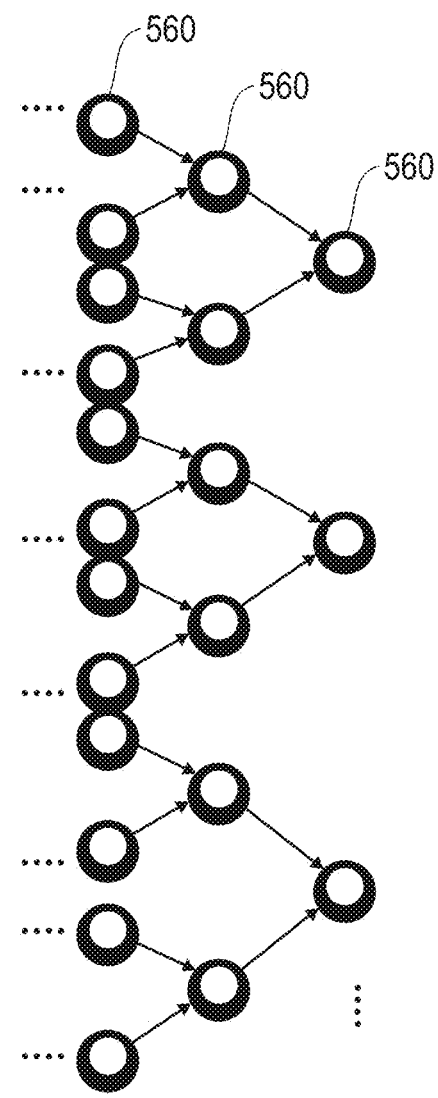
FIG. 16 illustrates multi-level merging, in accordance with an embodiment of the invention.

FIG. 16 illustrates multi-level merging, in accordance with an embodiment of the invention. Merger neurons 560 may be arranged to implement a hierarchical merge operation. For example, as shown in FIG. 16, multiply merger neurons 560 may be arranged into a three-level merge operation.

FIG. 17 illustrates a K-Means feature extraction system 600, in accordance with an embodiment of the invention. The system 600 is configured to take a patch from a video frame, and classify the patch based on objects contained within the patch, such as person, cyclist, car, or null if no objects are present. SVM classifier corelet receives a set of features, pooled from a high dimensional feature extractor.

Figure 18:
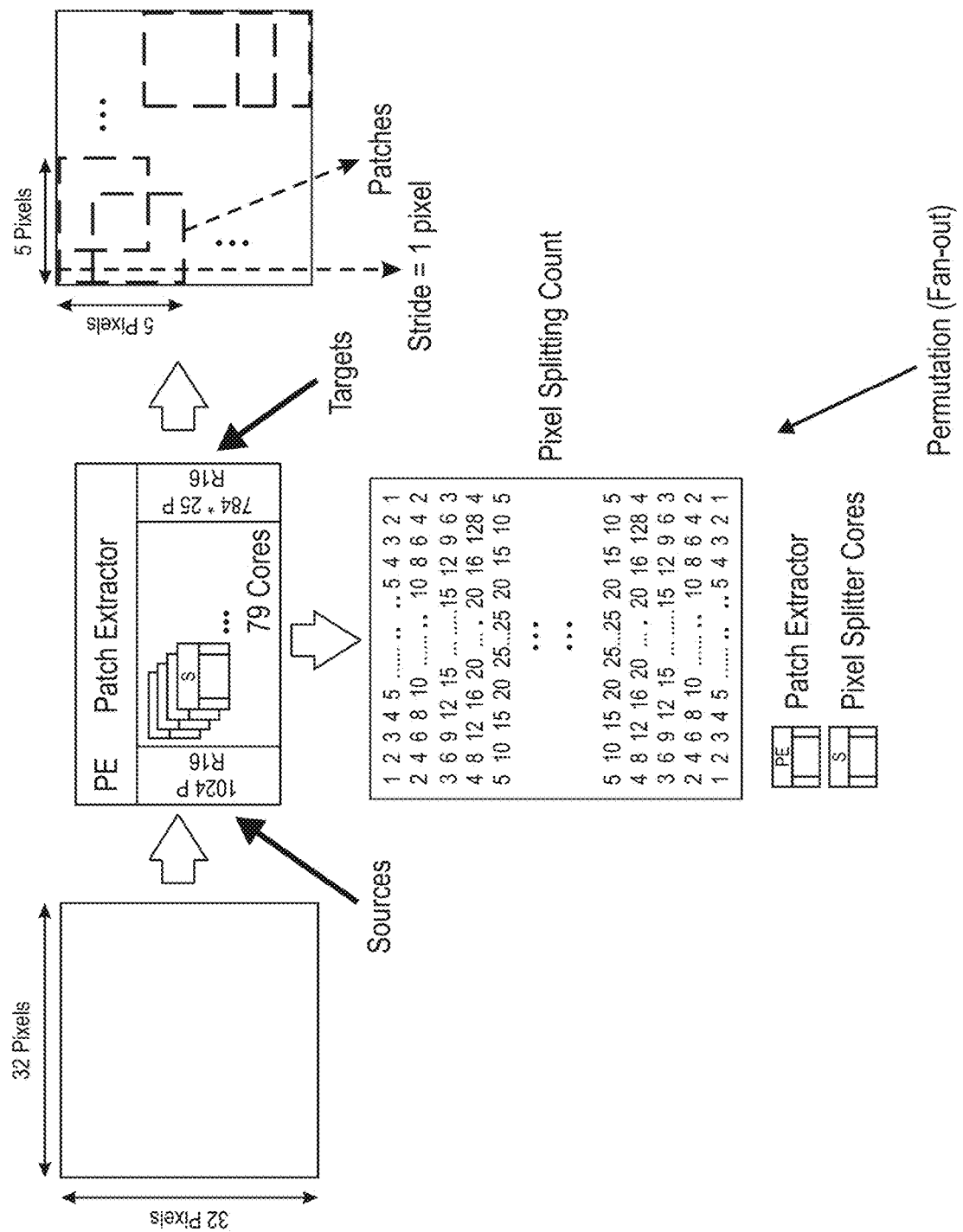
FIG. 18 illustrates processing of an example patch extraction corelet, in accordance with an embodiment of the invention.

FIG. 18 illustrates processing of an example patch extraction corelet, in accordance with an embodiment of the invention. An input patch of 32×32 pixels is split into 5×5 micro-patches, overlapping with a stride of one pixel in each dimension, for a total of (32−5+1)*(32−5+1)=784 micro-patches, or 784*5*5=19600 outputs. Each of these micro-patches is then processed by 256 different filters using one core circuit 10, for a total of 784*256=200704 features. A pooling system sums groups of 7×7 features at a time, producing a total of 4096 features that are fed to the SVM classifier. A second, mirrored graph is made for negative values.

Figure 19:
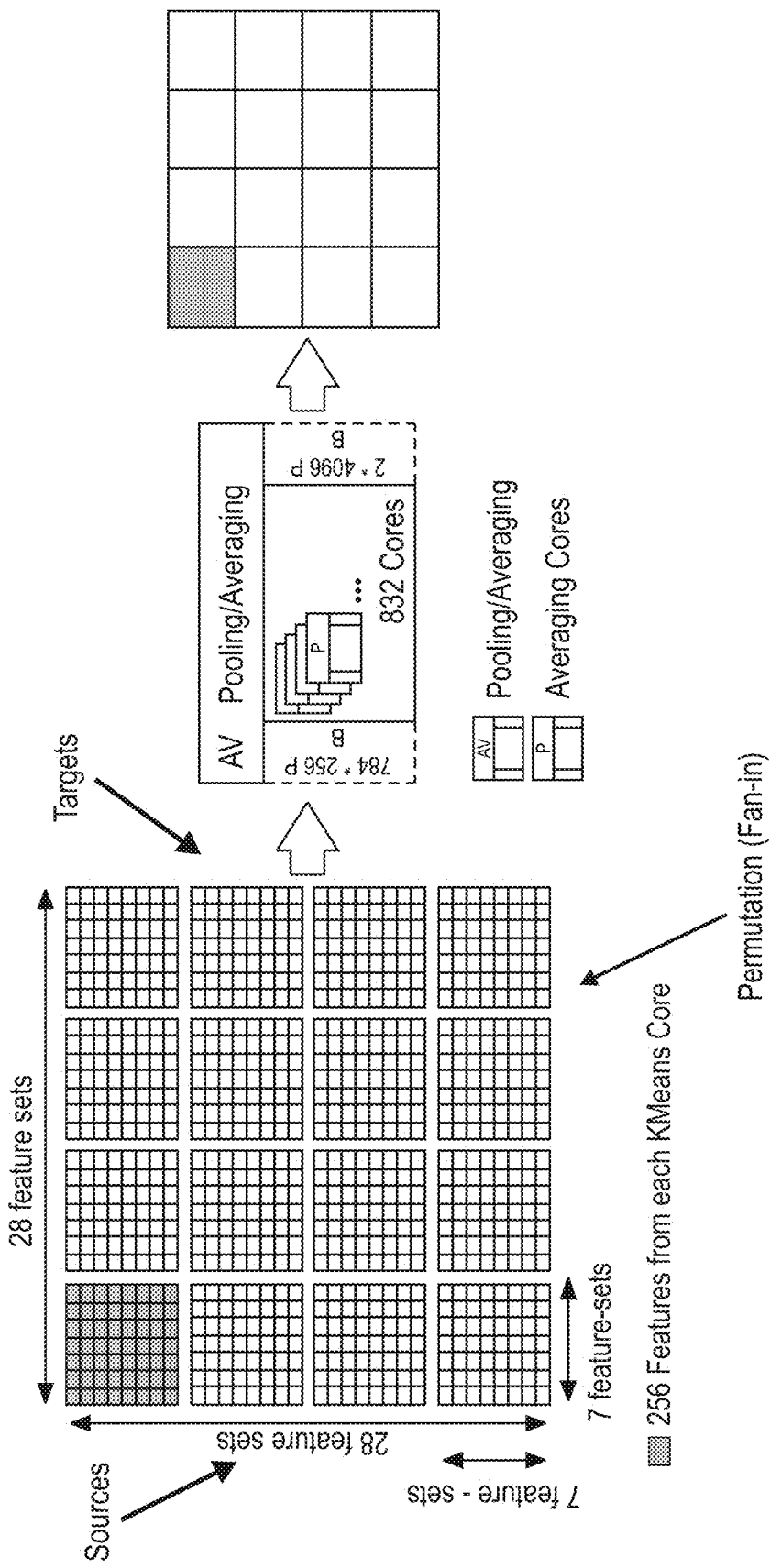
FIG. 19 illustrates processing of an example pooling/averaging corelet, in accordance with an embodiment of the invention.

FIG. 19 illustrates processing of an example pooling/averaging corelet, in accordance with an embodiment of the invention. Features maps are averaged in a grid of 7×7 feature sets, creating 16×256 averaged feature maps. Another 16×256 feature maps are generated for negative half.

Figure 20:
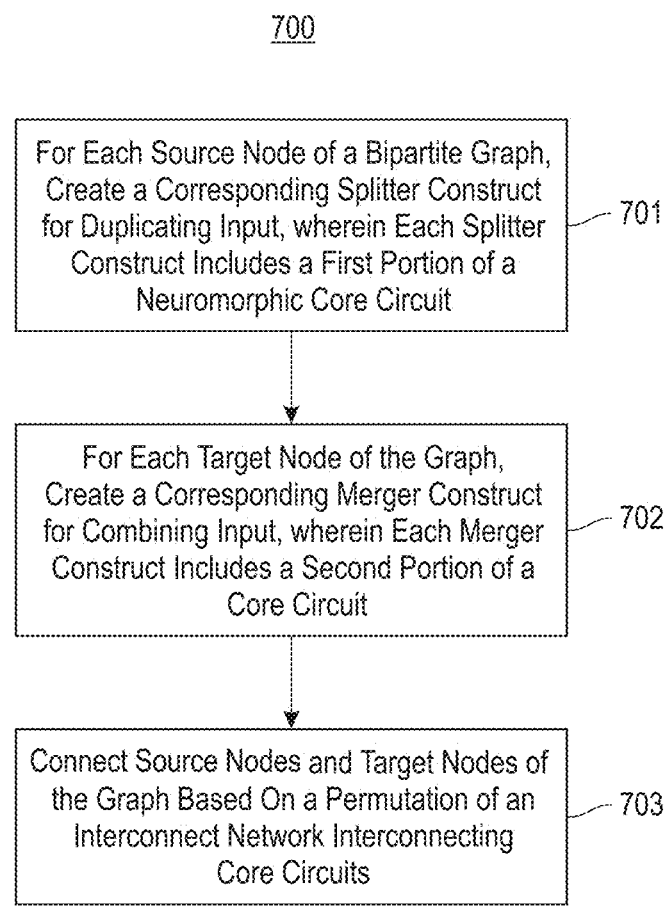
FIG. 20 illustrates a flowchart of an example process for mapping a bipartite graph onto a neuromorphic architecture comprising of a plurality of interconnected neuromorphic core circuits, in accordance with an embodiment of the invention.

FIG. 20 illustrates a flowchart of an example process 700 for mapping a bipartite graph onto a neuromorphic architecture comprising of a plurality of interconnected neuromorphic core circuits, in accordance with an embodiment of the invention. In process block 701, for each source node of the graph, create a corresponding splitter construct for duplicating input, wherein each splitter construct includes a first portion of a core circuit. In process block 702, for each target node of the graph, create a corresponding merger construct for combining input, wherein each merger construct includes a second portion of a core circuit. In process block 703, connect source nodes and target nodes of the graph based on a permutation of an interconnect network interconnecting core circuits.

Figure 21:
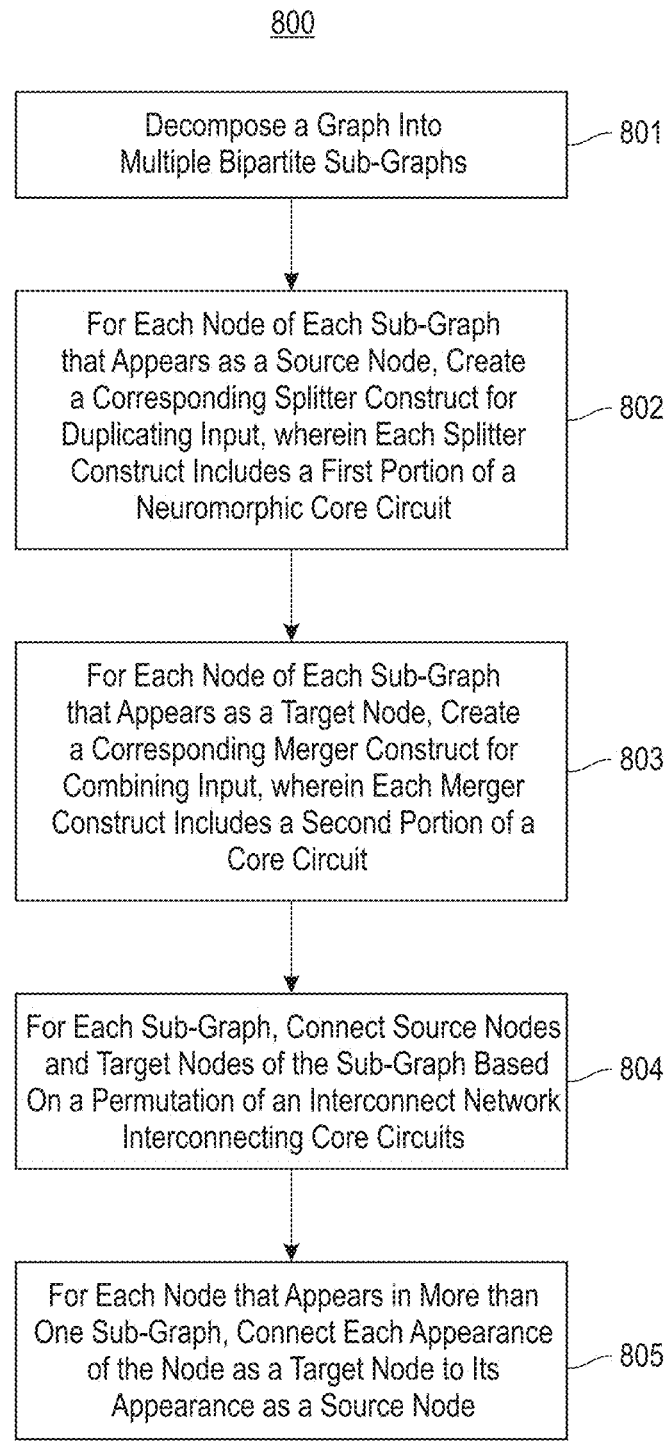
FIG. 21 illustrates a flowchart of an example process for mapping a graph onto a neuromorphic architecture comprising of a plurality of interconnected neuromorphic core circuits, in accordance with an embodiment of the invention.

FIG. 21 illustrates a flowchart of an example process 800 for mapping a graph onto a neuromorphic architecture comprising of a plurality of interconnected neuromorphic core circuits, in accordance with an embodiment of the invention. In process block 801, decompose the graph into multiple bipartite sub-graphs. In process block 802, for each node of each sub-graph that appears as a source node, create a corresponding splitter construct for duplicating input, wherein each splitter construct includes a first portion of a core circuit. In process block 803, for each node of each sub-graph that appears as a target node, create a corresponding merger construct for combining input, wherein each merger construct includes a second portion of a core circuit. In process block 804, for each sub-graph, connect source nodes and target nodes of the sub-graph based on a permutation of an interconnect network interconnecting core circuits. In process block 805, for each node that appears in more than one sub-graph, connect each appearance of the node as a target node to its appearance as a source node.

Figure 22:
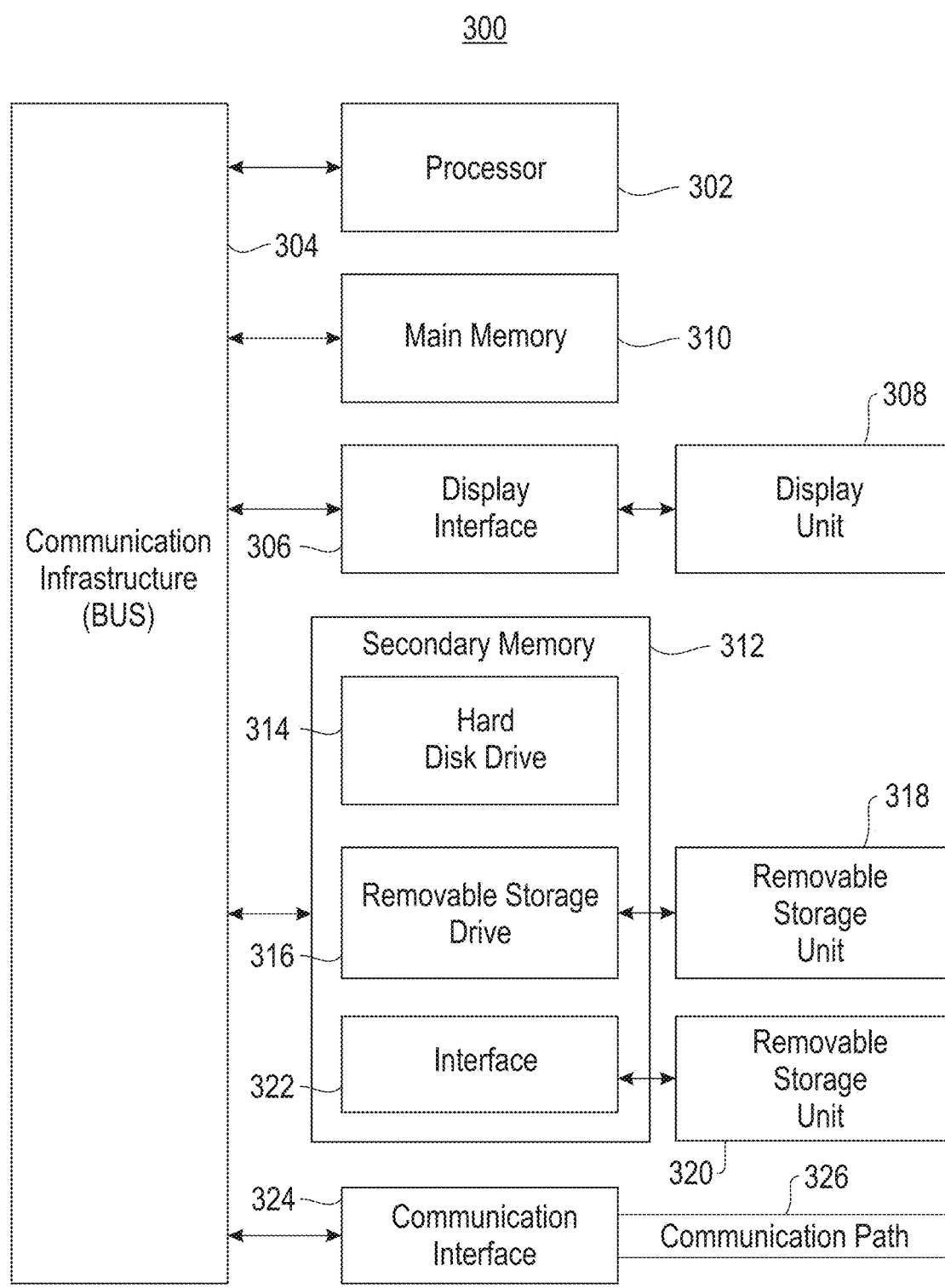
FIG. 22 is a high level block diagram showing an information processing system useful for implementing one embodiment of the present invention.

FIG. 22 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for mapping graphs onto core-based neuromorphic architectures. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a computer-readable hardware storage device having program code embodied therewith, the program code being executable by a computer to implement a method comprising:

for each source node of a bipartite graph, creating a corresponding splitter construct by programming multiple neurons of a plurality of interconnected neuromorphic core circuits to receive input spikes from one axon interconnected to the multiple neurons, duplicate the input spikes received, and send the duplicated input spikes to multiple target axons, thereby increasing effective neuron fan-out;

for each target node of the bipartite graph, creating a corresponding merger construct by programming one neuron of the core circuits to receive input spikes from multiple axons and combine the input spikes received, thereby increasing effective neuron fan-in; and connecting each splitter construct and each merger construct based on a permutation of an interconnect network interconnecting the core circuits.

2. The computer program product of claim 1, wherein:
the bipartite graph further comprises multiple weighted edges; and
each weight corresponding to each weighted edge is implemented using a splitter construct.

3. The computer program product of claim 1, wherein:
the bipartite graph further comprises multiple weighted edges; and
each weight corresponding to each weighted edge is implemented using a splitter and a merger construct.

4. The computer program product of claim 1, wherein:
the bipartite graph further comprises multiple stochastic weighted edges; and
each stochastic weight corresponding to each weighted edge is implemented using one or more of the following: a splitter construct with one or more stochastic neurons, and a merger construct with one or more stochastic axons or stochastic synapses.

5. A computer program product comprising a computer-readable hardware storage device having program code embodied therewith, the program code being executable by a computer to implement a method comprising:

decomposing a graph including a set of nodes and a set of directed edges into multiple bipartite sub-graphs;

for each sub-graph:
for each node of said sub-graph that appears as a source node, creating a corresponding splitter construct by programming multiple neurons of a plurality of interconnected neuromorphic core circuits to receive input spikes from one axon interconnected to the multiple neurons, duplicate the input spikes received, and send the duplicated input spikes to multiple target axons, thereby increasing effective neuron fan-out;

for each node of said sub-graph that appears as a target node, creating a corresponding merger construct by programming one neuron of the core circuits to receive input spikes from multiple axons and combine the input spikes received, thereby increasing effective neuron fan-in; and connecting each splitter construct and each merger construct based on a permutation of an interconnect network interconnecting the core circuits; and for each node that appears in more than one sub-graph, connect each corresponding merger construct for said node to a corresponding splitter construct for said node.

6. The computer program product of claim 5, wherein:
the set of directed edges includes multiple weighted edges; and
each weight corresponding to each weighted edge is implemented using a splitter construct.

7. The computer program product of claim 5, wherein:
the set of directed edges includes multiple weighted edges; and
each weight corresponding to each weighted edge is implemented using a splitter and a merger construct.

8. The computer program product of claim 5, wherein:
the set of directed edges includes multiple stochastic weighted edges; and
each stochastic weight corresponding to each weighted edge is implemented using one or more of the following: a splitter construct with one or more stochastic neurons, and a merger construct with one or more stochastic axons or stochastic synapses.

\* \* \* \* \*